United States Patent
Yamamoto

(10) Patent No.: US 9,448,405 B2
(45) Date of Patent: Sep. 20, 2016

(54) HEAD MOUNTED DISPLAY, MOTION DETECTOR, MOTION DETECTION METHOD, IMAGE PRESENTATION SYSTEM AND PROGRAM

(71) Applicant: Sony Computer Entertainment Inc., Tokyo (JP)

(72) Inventor: Hirotsugu Yamamoto, Tokyo (JP)

(73) Assignees: Sony Corporation, Tokyo (JP); Sony Interactive Entertainment Inc., Tokyo (JP)

(*) Notice: Subject to any disclaimer, the term of this patent is extended or adjusted under 35 U.S.C. 154(b) by 216 days.

(21) Appl. No.: 14/048,753

(22) Filed: Oct. 8, 2013

(65) Prior Publication Data

US 2014/0125579 A1   May 8, 2014

(30) Foreign Application Priority Data

Nov. 6, 2012 (JP) ................. 2012-244142

(51) Int. Cl.
| | |
|---|---|
| G02B 27/01 | (2006.01) |
| G09G 5/00 | (2006.01) |
| A61B 5/00 | (2006.01) |
| G06F 3/03 | (2006.01) |
| G06F 3/01 | (2006.01) |
| G06F 1/16 | (2006.01) |
| A45F 3/14 | (2006.01) |

(Continued)

(52) U.S. Cl.
CPC ............. *G02B 27/017* (2013.01); *G06F 3/012* (2013.01); *G06F 3/017* (2013.01); *G06F 3/0308* (2013.01); *G06F 3/0346* (2013.01); *G02B 2027/014* (2013.01); *G02B 2027/0138* (2013.01); *G02B 2027/0187* (2013.01)

(58) Field of Classification Search
CPC ... G06F 3/013; G06F 3/012; H04N 13/0429; G02B 27/017
USPC ......... 345/8, 157–158, 419, 633; 348/46–47, 348/115, 241; 359/630; 361/681; 396/52
See application file for complete search history.

(56) References Cited

U.S. PATENT DOCUMENTS 5,850,575 A * 12/1998 Ohishi ........................... 396/52
6,215,461 B1 * 4/2001 Ishibashi ............. G02B 27/017
                                                   345/8

(Continued)

FOREIGN PATENT DOCUMENTS

| JP | H086708 A | 1/1996 |
| JP | H0980510 A | 3/1997 |

(Continued)

OTHER PUBLICATIONS

Office Action for corresponding JP Patent Application No. 2012-244142, 9 pages dated May 31, 2016.

*Primary Examiner* — Lin Li
(74) *Attorney, Agent, or Firm* — Matthew B. Dernier, Esq.

(57) ABSTRACT

Disclosed herein is a head mounted display including: an enclosure accommodating a presentation section adapted to present a three-dimensional image and located in front of the eyes of a viewer when worn on the head of the viewer; and an imaging element provided in the enclosure and adapted to turn light external to the enclosure into an image, in which the imaging element images light that is vertically downward relative to the enclosure and forward in the direction of line of sight of the viewer when the enclosure is worn on the head of the viewer.

10 Claims, 18 Drawing Sheets

(51) Int. Cl.
*H04L 9/32* (2006.01)
*H04N 5/232* (2006.01)
*G06F 3/00* (2006.01)
*G06F 3/0346* (2013.01)

(56) References Cited

U.S. PATENT DOCUMENTS

| | | | |
|---|---|---|---|
| 6,346,929 B1 | 2/2002 | Fukushima | |
| 6,369,952 B1 * | 4/2002 | Rallison | G02B 27/017 359/630 |
| 7,980,771 B2 * | 7/2011 | Chamberlayne | A45F 3/14 396/423 |
| 9,024,872 B2 | 5/2015 | Takahama | |
| 2004/0041794 A1 * | 3/2004 | Kidode | G06F 1/163 345/173 |
| 2007/0132662 A1 * | 6/2007 | Morita | G06F 3/014 345/8 |
| 2008/0273099 A1 * | 11/2008 | Ono | H04N 5/23212 348/241 |
| 2009/0059501 A1 * | 3/2009 | Yamaguchi | 361/681 |
| 2009/0146952 A1 * | 6/2009 | Hirohata | G06F 3/0325 345/158 |
| 2012/0072733 A1 * | 3/2012 | Bennett | H04L 9/3234 713/180 |
| 2012/0218301 A1 * | 8/2012 | Miller | G02B 27/017 345/633 |
| 2012/0293935 A1 * | 11/2012 | Sherlock | G06F 1/163 361/679.03 |
| 2012/0306725 A1 * | 12/2012 | Hilkes | G09G 5/00 345/8 |
| 2013/0069869 A1 * | 3/2013 | Akao et al. | 345/157 |
| 2013/0127980 A1 * | 5/2013 | Haddick | G06F 3/013 348/14.08 |
| 2013/0278631 A1 * | 10/2013 | Border | G02B 27/017 345/633 |
| 2014/0055353 A1 * | 2/2014 | Takahama | G06F 3/012 345/156 |
| 2014/0118225 A1 * | 5/2014 | Jerauld | A61B 5/486 345/8 |

FOREIGN PATENT DOCUMENTS

| | | | | |
|---|---|---|---|---|
| JP | 2000-102036 A | * | 4/2000 | G06F 3/00 |
| JP | 2001-356875 A | * | 12/2001 | G06F 3/00 |
| JP | 2004-205711 A | | 7/2004 | |
| JP | 2005-172851 A | | 6/2005 | |
| JP | 2005-275247 | * | 10/2005 | G02B 23/26 |
| JP | 2005-275247 A | * | 10/2005 | G02B 23/26 |
| JP | 2010-146481 A | | 7/2010 | |
| WO | 2012147702 A1 | | 11/2012 | |

* cited by examiner

F I G . 2
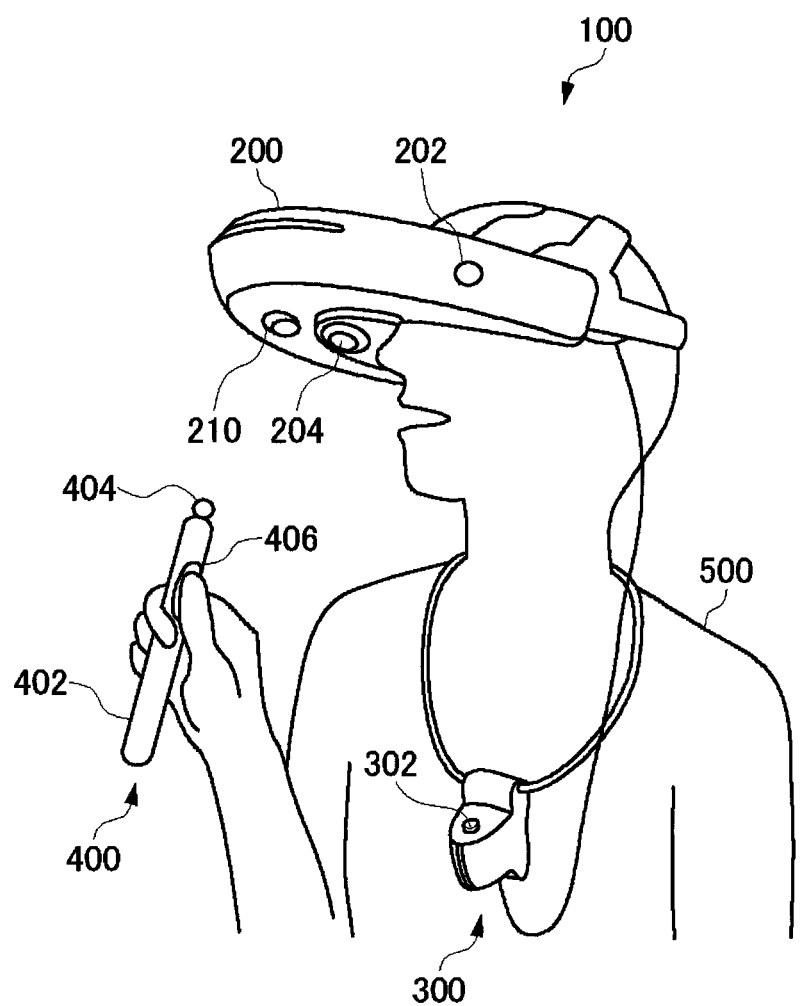

HEAD MOUNTED DISPLAY, MOTION DETECTOR, MOTION DETECTION METHOD, IMAGE PRESENTATION SYSTEM AND PROGRAM

BACKGROUND

The present disclosure relates to a head mounted display, motion detector, motion detection method and image presentation system.

Recent years have witnessed the progress of technological developments for presenting three-dimensional images, with head mounted displays capable of presenting three-dimensional images with depth becoming pervasive. A head mounted display is worn by the user, the viewer, in such a manner as to cover both of his or her eyes and move along with the motion of the user's head. Therefore, by tracking the motion of the user's head and feeding back the result thereof to the image of a virtual space presented by the head mounted display, it is probably possible to present the user with a high immersive sensation and sense of presence to the virtual space.

Further, a head mounted display is worn by the user, the viewer, in such a manner as to cover both of his or her eyes. Therefore, it is difficult to see the real image of the outside world such as his or her hand with the head mounted display on. On the other hand, if the motion of the user's hand can be tracked, it is probably possible to use instructions, each defined in accordance with a type of motion thereof, for controlling the head mounted display itself and the image presented.

The nine-axis approach designed to measure three-axis acceleration, three-axis angular velocity and three-axis geomagnetism is among known approaches for tracking the motion of a head mounted display. This approach has difficulty tracking the motion due to geomagnetic dip depending on the region and may be susceptible to surrounding magnetic fields such as those produced by steel frames of buildings and motors. Further, there are demands for development of a small and compact device adapted to detect the motion of the user's hand which permits intuitive operation by the user.

In light of the foregoing, it is desirable to provide a technology for detecting the motion of the user wearing a head mounted display.

According to an embodiment of the present disclosure, there is provided a head mounted display. The head mounted display includes an enclosure and imaging element. The enclosure accommodates a presentation section adapted to present a three-dimensional image and is located in front of the eyes of a viewer when worn on the head of the viewer. The imaging element is provided in the enclosure and turns light external to the enclosure into an image. Here, the imaging element images light that is vertically downward relative to the enclosure and forward in the direction of line of sight of the viewer when the enclosure is worn on the head of the viewer.

According to the embodiment of the present disclosure, there is also provided a motion detector. The motion detector includes an image acquisition section, bright spot detection unit, vector acquisition unit, pitch acquisition section and yaw acquisition section. The image acquisition section acquires an image captured by an imaging element attached to the head of a user by imaging infrared light radiated by a light-emitting element that moves along with the motion of the user's hand. The bright spot detection unit detects a bright spot of infrared light in the image captured by the imaging element. The vector acquisition unit acquires a vector having, as an end point, the bright spot detected by the bright spot detection unit, and, as a start point, the center of the image captured by the imaging element. The pitch acquisition section acquires, as a pitch of the light-emitting element relative to the imaging element, the length of the vector acquired by the vector acquisition unit. The yaw acquisition section acquires, as a yaw of the light-emitting element relative to the imaging element, the declination of the vector acquired by the vector acquisition unit.

According to the embodiment of the present disclosure, there is also provided a motion detection method. The motion detection method causes a processor to perform a step of acquiring an image captured by an imaging element attached to the head of a user by imaging infrared light radiated by a light-emitting element that moves along with the motion of the user's hand. The motion detection method causes the processor to perform another step of detecting a bright spot of infrared light in the acquired image. The motion detection method causes the processor to perform still another step of acquiring a vector having, as an end point, the detected bright spot, and, as a start point, the center of the image captured by the imaging element. The motion detection method causes the processor to perform still another step of acquiring the length of the acquired vector. The motion detection method causes the processor to perform still another step of acquiring the declination of the acquired vector.

According to the embodiment of the present disclosure, there is also provided an image presentation system that includes a head mounted display and a light-emitting element attached to a grip section gripped by a viewer and adapted to radiate infrared light. Here, the head mounted display includes an enclosure, imaging element and motion tracking section. The enclosure accommodates a presentation section adapted to present a three-dimensional image and is located in front of the eyes of the viewer when worn on the head of the viewer. The imaging element is provided in the enclosure and images infrared light radiated by the light-emitting element that moves along with the motion of the grip section. The motion tracking section tracks the change in relative position of the light-emitting element with respect to the imaging element by analyzing the infrared light image captured by the imaging element.

According to the embodiment of the present disclosure, there is also provided a program that causes a computer to implement the steps of the above method.

This program may be provided as part of firmware incorporated in equipment adapted to basically control hardware resources such as video, audio, gaming equipment and head mounted display. This firmware is stored, for example, in a semiconductor memory such as ROM (Read Only Memory) or flash memory provided in the equipment. A computer-readable recording media storing this firmware program may be provided to supply this firmware or update part of the firmware. Alternatively, this program may be transmitted via a communication line.

It should be noted that any combinations of the above components and any conversions of expressions of the present disclosure between "method," "device," "system," "computer program," "data structure," "recording media" and so on are also effective as modes of the present disclosure.

The present disclosure provides a technology for detecting the motion of the user wearing a head mounted display.

BRIEF DESCRIPTION OF THE DRAWINGS

FIG. 2 is a diagram schematically illustrating a scene in which the image presentation system according to the embodiment is used;

DETAILED DESCRIPTION OF THE PREFERRED EMBODIMENT (Overall Configuration of an Image Presentation System 100)

Figure 1:
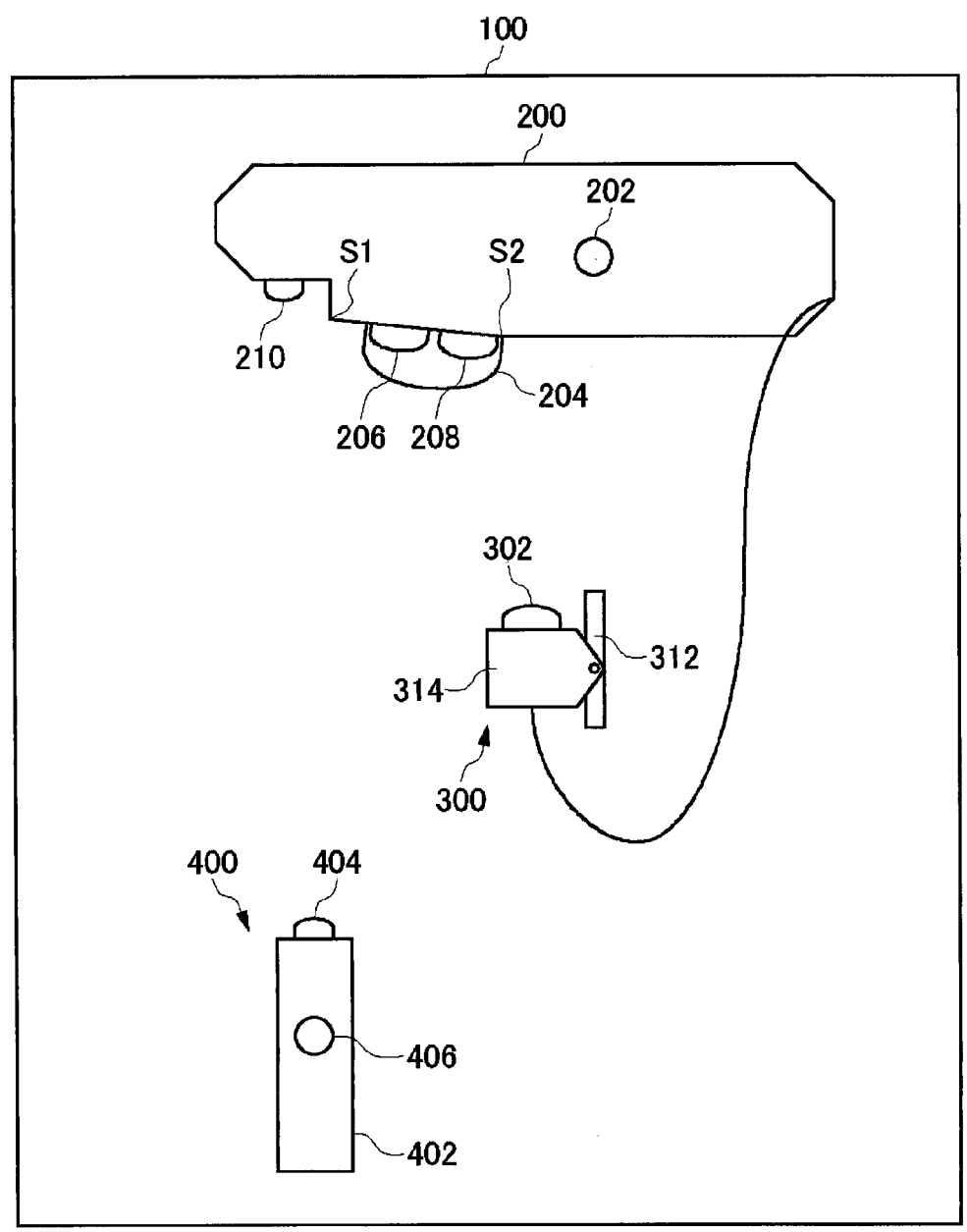
FIG. 1 is a diagram schematically illustrating the outline of the overall configuration of an image presentation system according to an embodiment of the present disclosure.

FIG. 1 is a diagram schematically illustrating the outline of the overall configuration of the image presentation system 100 according to an embodiment. The same system 100 according to the embodiment includes a head mounted display 200, torso fastened device 300 and position specification device 400.

The head mounted display 200 has an enclosure attachable to the head of the user, a viewer, and presents a three-dimensional image to the user using a presentation section incorporated in the enclosure. The same display 200 further includes a first button 202, enclosure imaging section 204 and enclosure light-emitting element 210. The first button 202 serves as an interface adapted, for example, to turn on and off the power. The enclosure imaging section 204 is provided on the enclosure of the head mounted display 200 to image light external to the enclosure. The enclosure light-emitting element 210 is provided on the enclosure of the head mounted display 200 to radiate light externally from the enclosure. The enclosure imaging section 204 further includes first and second imaging elements 206 and 208.

The torso fastened device 300 is installed to the torso of the user wearing the head mounted display 200 such as the user's chest or somewhere around there to image light radiated by the enclosure light-emitting element 210 of the head mounted display 200. Therefore, the same device 300 includes a torso imaging element 302 and element support section 314 attachable to a user 500. As illustrated in FIG. 1, the torso fastened device 300 and head mounted display 200 are connected in a wired manner. The head mounted display 200 can acquire an image captured by the torso imaging element 302. The same display 200 can identify the relative position of the enclosure light-emitting element 210 with respect to the torso fastened device 300 by analyzing the acquired image. It should be noted that the torso fastened device 300 and head mounted display 200 may be connected in a wireless manner by using, for example, an infrared communication technique. Further, the element support section 314 includes an adjustment section 312 adapted to adjust the tilt of the torso imaging element 302.

The position specification device 400 includes a grip section 402, position specification light-emitting element 404 and second button 406. The grip section 402 is gripped by the user. The position specification light-emitting element 404 is a light-emitting element attached to the grip section 402. The second button 406 controls the manner in which the position specification light-emitting element 404 emits light. The manner in which the same element 404 emits light changes between when the second button is turned ON and when it is turned OFF by the user. The enclosure imaging section 204 of the head mounted display 200 images light radiated by the position specification light-emitting element 404, turning it into an image. The head mounted display 200 can identify the position of the position specification light-emitting element 404 and whether or not the second button has been pressed by analyzing the image. It should be noted that it is not necessary for the position specification device 400 to include the grip section 402 so long as the position specification light-emitting element 404 moves along with the motion of the user's hand. For example, the same device 400 may include the position specification light-emitting element 404 on a ring or bracelet.

FIG. 2 is a diagram schematically illustrating a scene in which the image presentation system 100 according to the embodiment is used. As illustrated in FIG. 2, the head mounted display 200 is attached to the head of the user 500 when used and moves along with the motion of the head of the user 500. The torso fastened device 300 is suspended by a cord-like member placed around the user's neck like a necklace and installed, for example, somewhere from the center of the chest to above the abdomen of the user 500. It should be noted that although not shown, the torso fastened device 300 may be fastened to the user's torso using a fastening member such as a belt. The position specification device 400 is gripped by the user 500 when used. Therefore, when the user 500 moves the hand gripping the position specification device 400, the position specification light-emitting element 404 moves along with the motion of the user's hand.

Figure 3:
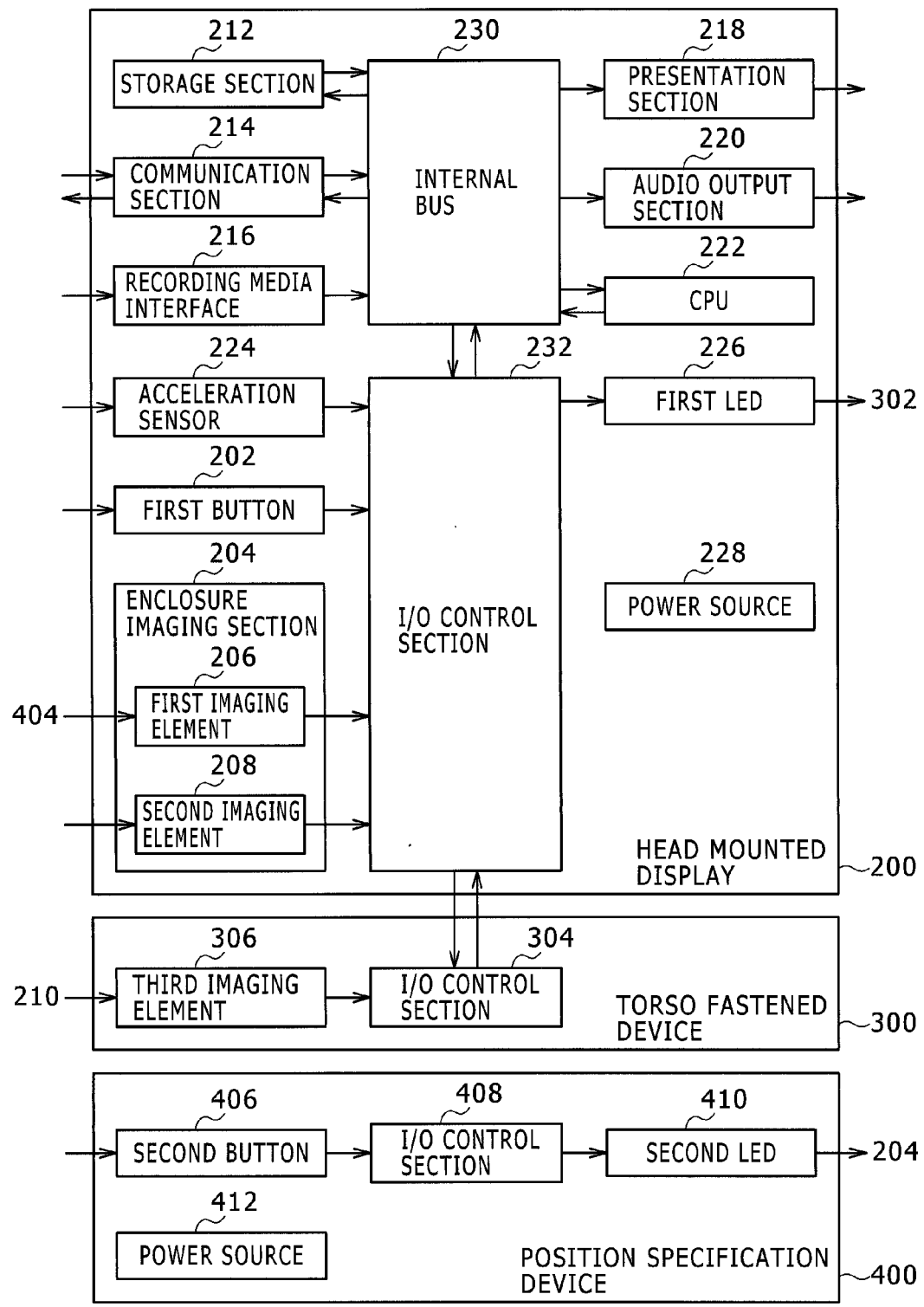
FIG. 3 is a diagram schematically illustrating the internal configuration of the image presentation system according to the embodiment.

FIG. 3 is a diagram schematically illustrating the internal configuration of the image presentation system 100 according to the embodiment. As described earlier, the image presentation system 100 according to the embodiment includes the head mounted display 200, torso fastened device 300 and position specification device 400.

The head mounted display 200 includes, in addition to the above-mentioned first button 202 and enclosure imaging section 204, a storage section 212, communication section 214, recording media interface 216, presentation section 218, audio output section 220, CPU (Central Processing Unit) 222, acceleration sensor 224, first LED (Light Emitting Diode) 226, power source 228, internal bus 230 and I/O (Input/Output) control section 232.

The first imaging element 206 images light in the invisible range such as infrared light. More specifically, the same element 206 images light that has passed through an optical filter adapted to attenuate light other than that in the invisible range to be imaged. In contrast, the second imaging element 208 includes an optical filter adapted to attenuate light other than that in the visible range and images light in the visible range. Each of the first and second imaging elements 206 and 208 can be implemented by a known solid-state imaging element such as CCD (Charge Coupled Device) or CMOS (Complementary Metal Oxide Semiconductor) image sensor.

Further, each of the first and second imaging elements 206 and 208 includes a fisheye lens to image light that is vertically downward relative to the enclosure of the head mounted display 200 and forward in the direction of line of sight of the user 500 when the head mounted display 200 is worn on the head of the user 500. As shown by the line segment connecting reference numerals S1 and S2 in FIG. 1, the bottom side of the enclosure of the head mounted display 200 has a sloped area that tilts in the direction of line of sight of the user 500 and vertically upward with the user 500 wearing the head mounted display 200. Both of the first and second imaging elements 206 and 208 are provided on the sloped area available on the bottom side of the enclosure of the head mounted display 200. This allows the same elements 206 and 208 to image light that is vertically downward relative to the enclosure of the head mounted display 200 and forward in the direction of line of sight of the user 500 when the head mounted display 200 is worn on the head of the user 500.

The storage section 212 stores firmware including an operation program adapted to comprehensively control the operation of the head mounted display 200. Further, the storage section 212 stores images captured by the enclosure imaging section 204 and those acquired from the torso fastened device 300 and serves as a work area for the processes performed, for example, by the CPU 222. The same section 212 can be implemented by a known volatile or non-volatile memory.

The communication section 214 is an interface for the head mounted display 200 to communicate with external equipment of the image presentation system 100. The same section 214 can be implemented by a known wireless communication technique such as WiFi (registered trademark) or Bluetooth (registered trademark).

The recording media interface 216 is an interface adapted to read a recording media such as DVD (Digital Versatile Disc), Bluray Disc (registered trademark) or flash memory storing content such as movies and games. Content read by the recording media interface 216 is processed by the CPU 222 and supplied to the user via the presentation section 218 and audio output section 220. The recording media interface 216 can be implemented by a known technique such as optical drive.

The presentation section 218 is a device adapted to present images to the user 500. Although not shown, the same section 218 includes presentation sections for left and right eyes so that parallax images for left and right eyes can be presented respectively to the left and right eyes of the user 500 independently of each other. This makes it possible to present a three-dimensional image with depth to the user 500. The presentation section 218 can be implemented by a known display technique such as LCD (Liquid Crystal Display) or OELD (Organic Electro-Luminescence Display).

The audio output section 220 is a device adapted to present audio to the user 500. Although not shown, the same block 220 is connected to earphones for left and right ears, thus allowing stereo audio to be presented to the user.

The CPU 222 processes information acquired from the different sections of the head mounted display 200 via the internal bus 230, thus handling not only content presentation but also other processes including the head tracking process and hand tracking process which will be described later.

The acceleration sensor 224 detects the acceleration of the head mounted display 200. More specifically, the same sensor 224 detects the orientation of gravity to detect the tilt of the head mounted display 200. The acceleration sensor 224 can be implemented, for example, by a known low-g acceleration sensor. On the other hand, the first LED 226 is an LED light source adapted to radiate light externally from the head mounted display 200, radiating, for example, light in the invisible range such as infrared light. The enclosure light-emitting element 210 as described above can be implemented by the first LED 226.

The I/O control section 232 controls not only inputs from the first button 202, enclosure imaging section 204 and acceleration sensor 224 but also the radiation of light by the first LED 226. The same section 232 also controls the exchange of information with an I/O control section 304 provided in the torso fastened device 300. The power source 228 includes a battery which is not shown, supplying power to drive the different sections of the head mounted display 200.

The torso fastened device 300 includes the I/O control section 304 and a third imaging element 306. The same element 306 corresponds to the torso imaging element 302 described above and can be implemented by a known imaging element such as CCD or CMOS. Further, the third imaging element 306 includes a perspective projection lens. Although described in detail later, the same element 306 includes an optical filter adapted to transmit light at a wavelength near that of light radiated by the first LED 226 provided in the head mounted display 200 and attenuate light at other wavelengths. This makes it possible to selectively image light radiated by the first LED 226. Power for driving the different sections of the torso fastened device 300 is supplied from the power source 228 by a cable which is not shown.

The I/O control section 304 outputs the image captured by the third imaging element 306 to the I/O control section 232 provided in the head mounted display 200. Further, the I/O control section 304 receives instructions from the I/O control section 232 provided in the head mounted display 200 to start or stop the imaging performed by the third imaging element 306, thus controlling the imaging operation of the same element 306.

The position specification device 400 includes the second button 406, an I/O control section 408, second LED 410 and power source 412.

The second LED 410 corresponds to the position specification light-emitting element 404 described above, radiating light in the non-visible range such as infrared light under control of the I/O control section 408. The same section 408 controls the manner in which the second LED 410 emits light in accordance with the ON/OFF state of the second button 406. More specifically, the I/O control section 408 keeps the second LED 410 lit at all times when the second button 406 is ON. Further, the same section 408 causes the second LED 410 to flash at a predetermined frequency when the second button 406 is OFF. Here, assuming that the flashing frequency is F[Hz], the I/O control section 408 repeatedly keeps the second LED 410 lit for 1/(2×F) of a second when the second button 406 is OFF and keeps the same LED 410 unlit for the following 1/(2×F) of a second. The power source 412 includes a battery which is not shown, supplying power to drive the different sections of the position specification device 400.

Figure 4:
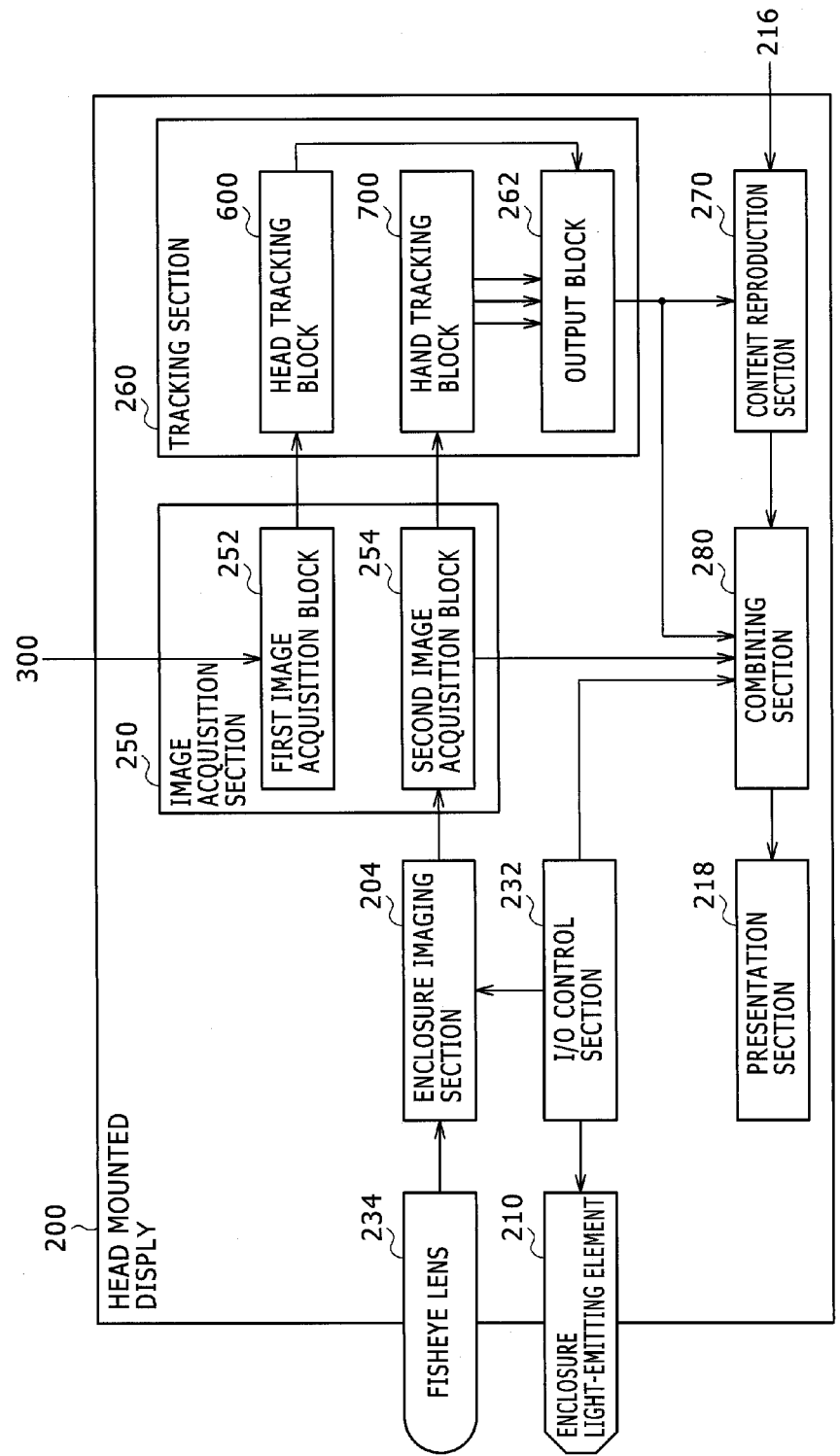
FIG. 4 is a diagram schematically illustrating the functional configuration of a head mounted display according to the embodiment.

FIG. 4 is a diagram schematically illustrating the functional configuration of the head mounted display 200 according to the embodiment. The head mounted display 200 according to the embodiment includes a fisheye lens 234, the enclosure imaging section 204, presentation section 218, an image acquisition section 250, tracking section 260, content reproduction section 270 and combining section 280. The image acquisition section 250 further includes first and second image acquisition blocks 252 and 254. Still further, the tracking section 260 includes a head tracking block 600, hand tracking block 700 and output block 262.

The fisheye lens 234 has an angle of view of about 180 degrees and is used to capture an image, for example, by equidistant projection. Although capturing images via the fisheye lens 234, the first and second imaging elements 206 and 208 are collectively referred to as the enclosure imaging section 204 in FIG. 4. In the present specification, the first and second imaging elements 206 and 208 will be collectively referred to as the enclosure imaging section 204 except where it is necessary to distinguish between the two. The first and second imaging elements 206 and 208 may capture images via different fisheye lenses.

As described above, the position specification device 400 is gripped by the hand of the user 500 when used. Therefore, the position specification light-emitting element 404 is located vertically downward relative to the enclosure of the head mounted display 200 and forward in the direction of line of sight of the user 500. The enclosure imaging section 204 can image light that is vertically downward relative to the enclosure of the head mounted display 200 and forward in the direction of line of sight of the user 500 when the head mounted display 200 is worn on the head of the user 500. This makes it possible for the enclosure imaging section 204 to arrange the position specification light-emitting element 404 that moves along with the motion of the hand of the user 500 easily within the angle of view.

The second image acquisition block 254 provided in the image acquisition section 250 acquires an image captured by the enclosure imaging section 204. The hand tracking block 700 provided in the tracking section 260 acquires an image captured by the enclosure imaging section 204 from the second image acquisition block 254. The same block 700 tracks the change in position of the bright spot derived from the position specification light-emitting element 404 by analyzing the acquired image. The same element 404 moves along with the motion of the hand of the user 500, thus allowing for the hand tracking block 700 to detect the motion of the hand of the user 500. The hand tracking block 700 can be implemented by the CPU 222 executing the program adapted to implement the hand tracking process stored in the storage section 212 shown in FIG. 3. The hand tracking process performed by the hand tracking block 700 will be described later.

The first image acquisition block 252 provided in the image acquisition section 250 acquires an image captured by the torso imaging element 302 of the torso fastened device 300. The head tracking block 600 acquires the image acquired by the first image acquisition block 252.

As described above, the torso imaging element 302 images a subject including light radiated by the enclosure light-emitting element 210 of the head mounted display 200. Therefore, the bright spot derived from the enclosure light-emitting element 210 is imaged in the image acquired by the first image acquisition block 252. Therefore, the head tracking block 600 tracks the change in position of the position specification light-emitting element 404 by analyzing the acquired image. This allows the same block 600 to detect the relative motion of the enclosure light-emitting element 210 with respect to the torso imaging element 302. As a result, the head tracking block 600 can detect the orientation of the head of the user 500 with respect to the torso of the user 500, i.e., the direction of line of sight. The head tracking block 600 can be implemented by the CPU 222 executing the program adapted to implement the head tracking process stored in the storage section 212 shown in FIG. 3. It should be noted that the head tracking process performed by the head tracking block 600 will be described in detail later.

The output block 262 provided in the tracking section 260 outputs the results of the processes performed by the head tracking block 600 and hand tracking block 700. The content reproduction section 270 reproduces content read by the recording media interface 216. The same section 270 changes the image presented to the user 500 in accordance with the output result of the tracking section 260 acquired from the output block 262. For example, if the line of sight of the user 500 is oriented to the left with respect to his or her torso, the content reproduction section 270 causes the presentation section 218 to display a three-dimensional image associated with the left direction. The content reproduction section 270 can be implemented by using the resources of the storage section 212 and CPU 222.

The combining section 280 combines the image generated by the content reproduction section 270 and the image captured by the enclosure imaging section 204. More specifically, the same section 280 acquires the direction of line of sight of the user 500 from the output block 262. If the acquired direction of line of sight is vertically downward, i.e., the direction toward the hands or feet of the user 500, the combining section 280 combines the visible light image captured by the enclosure imaging section 204 and the image generated by the content reproduction section 270. The combining of the images by the combining section 280 can be implemented by the CPU 222 executing a program adapted to implement a known image processing technique such as alpha blending. As another means of acquiring the direction toward the hands, it is possible to use the direction of the position specification light-emitting element 404 with respect to a coordinate system 10 of the head mounted display 200 that can be acquired by the hand tracking process which will be described later.

The head mounted display 200 according to the embodiment is located in front of the eyes of the user 500 and blocks visibility to the surrounding when worn on the head of the user 500. The user 500 views a virtual three-dimensional image presented by the presentation section 218, thus providing a higher immersive sensation and sense of presence to the user 500. On the other hand, as the combining section 280 combines a real image of the hands and feet and the surrounding area of the user 500, manual operations, walking and other tasks are easier with the user 500 wearing the head mounted display 200, thus contributing to improved usability. It should be noted that whether the combining section 280 combines the image captured by the enclosure imaging section 204 may be switchable, for example, by pressing the first button 202.

Figure 5:
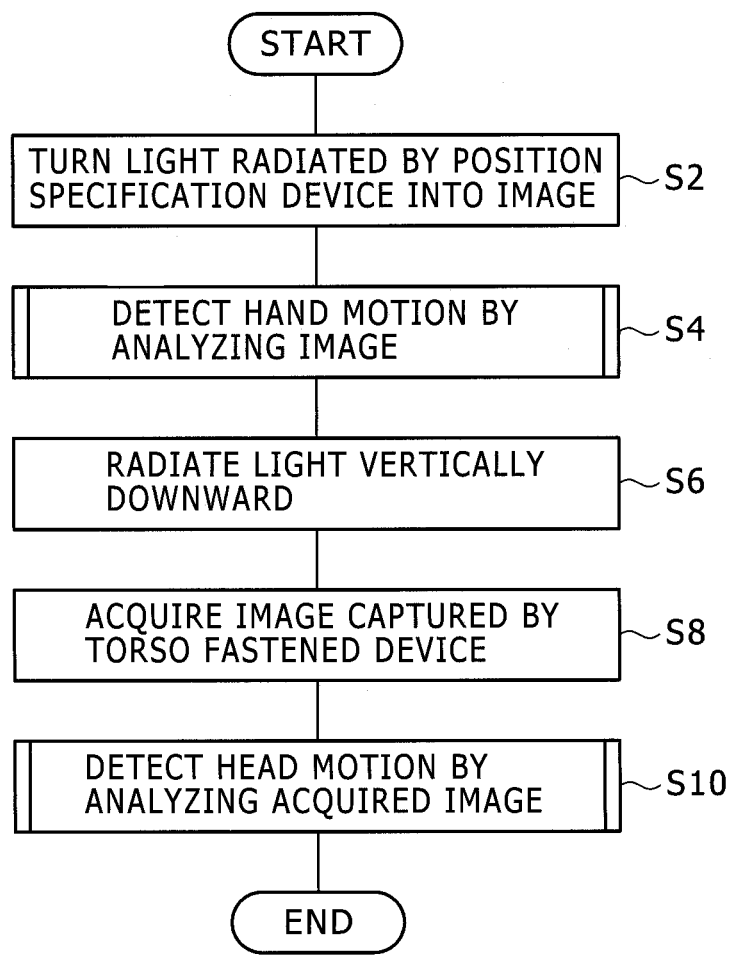
FIG. 5 is a flowchart illustrating the flow of a tracking process performed by the image presentation system according to the embodiment.

FIG. 5 is a flowchart illustrating the flow of the tracking process performed by the image presentation system 100 according to the embodiment. The process shown in this flowchart begins, for example, when the power for the head mounted display 200 is turned ON.

The enclosure imaging section 204 images light radiated by the position specification light-emitting element 404 of the position specification device 400, turning it into an image (S2). The hand tracking block 700 detects the motion of the hand of the user 500 by analyzing the image captured by the enclosure imaging section 204 (S4).

The enclosure light-emitting element 210 radiates light vertically downward relative to the head mounted display 200 under control of the I/O control section 232 (S6). The torso imaging element 302 of the torso fastened device 300 acquires an image by imaging light radiated vertically downward by the enclosure light-emitting element 210 (S8). The head tracking block 600 detects the relative motion of the head mounted display 200 with respect to the torso imaging element 302 by analyzing the image acquired by the first image acquisition block 252 and captured by the torso imaging element 302 (S10).

When the head tracking block 600 detects the relative motion of the head mounted display 200 with respect to the torso imaging element 302, the process shown in the present flowchart is terminated. It should be noted that although a case has been described for reasons of convenience in which the hand motion is detected by the hand tracking block 700 first followed by the detection of the head motion by the head tracking block 600, the head motion may be detected first followed by the detection of the hand motion. Alternatively, the head and hand motions may be detected in parallel.

(Hand Tracking)

The overall configuration of the image presentation system 100 and the outline of the tracking process have been described above. A description will be given next of hand tracking according to the present embodiment.

Figure 6:
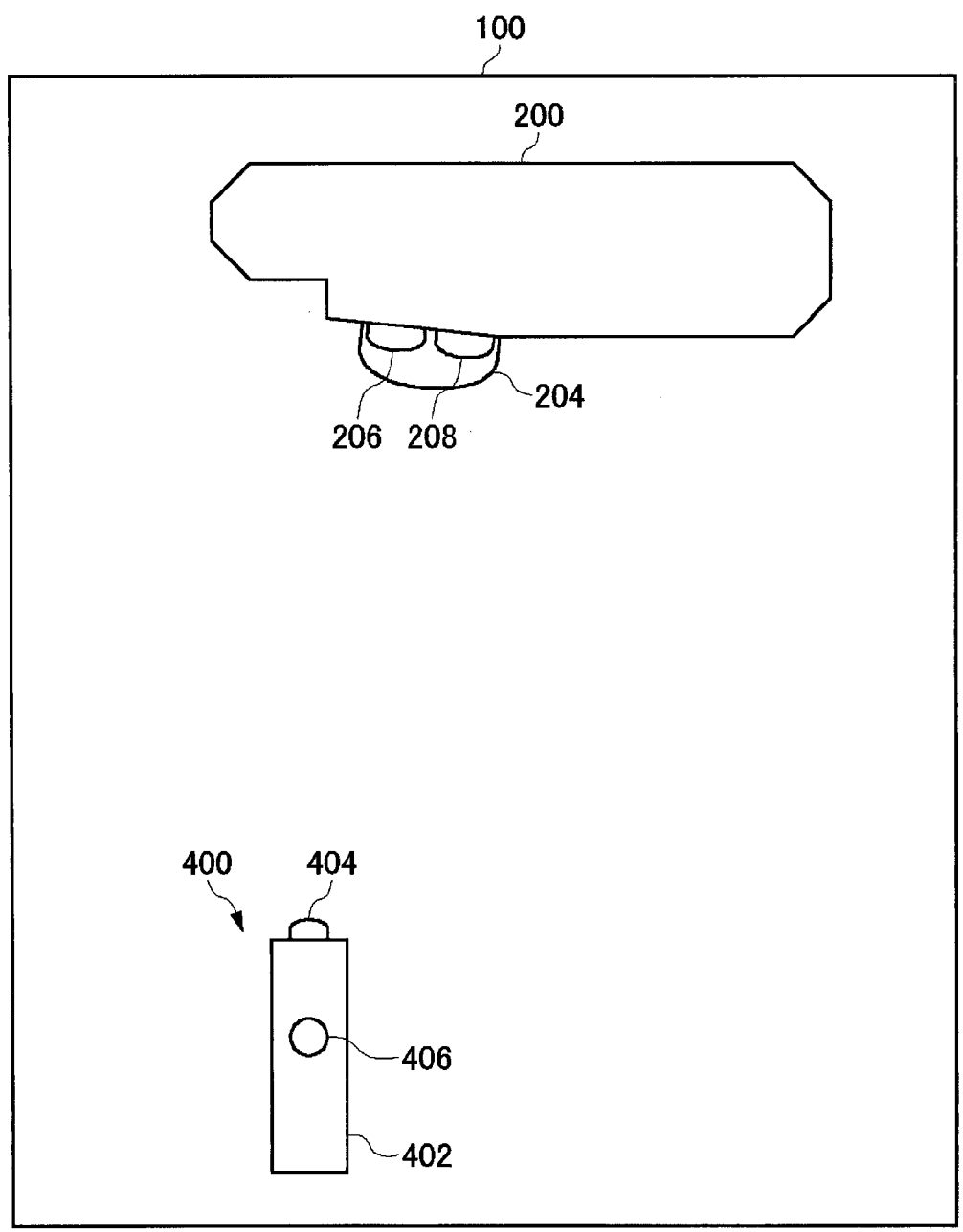
FIG. 6 is a diagram schematically illustrating the outline of hand tracking according to the embodiment.

FIG. 6 is a diagram schematically illustrating the configuration of the image presentation system 100 used for hand tracking. As illustrated in FIG. 6, the head mounted display 200 and position specification device 400 are used for hand tracking according to the embodiment.

Figure 7:
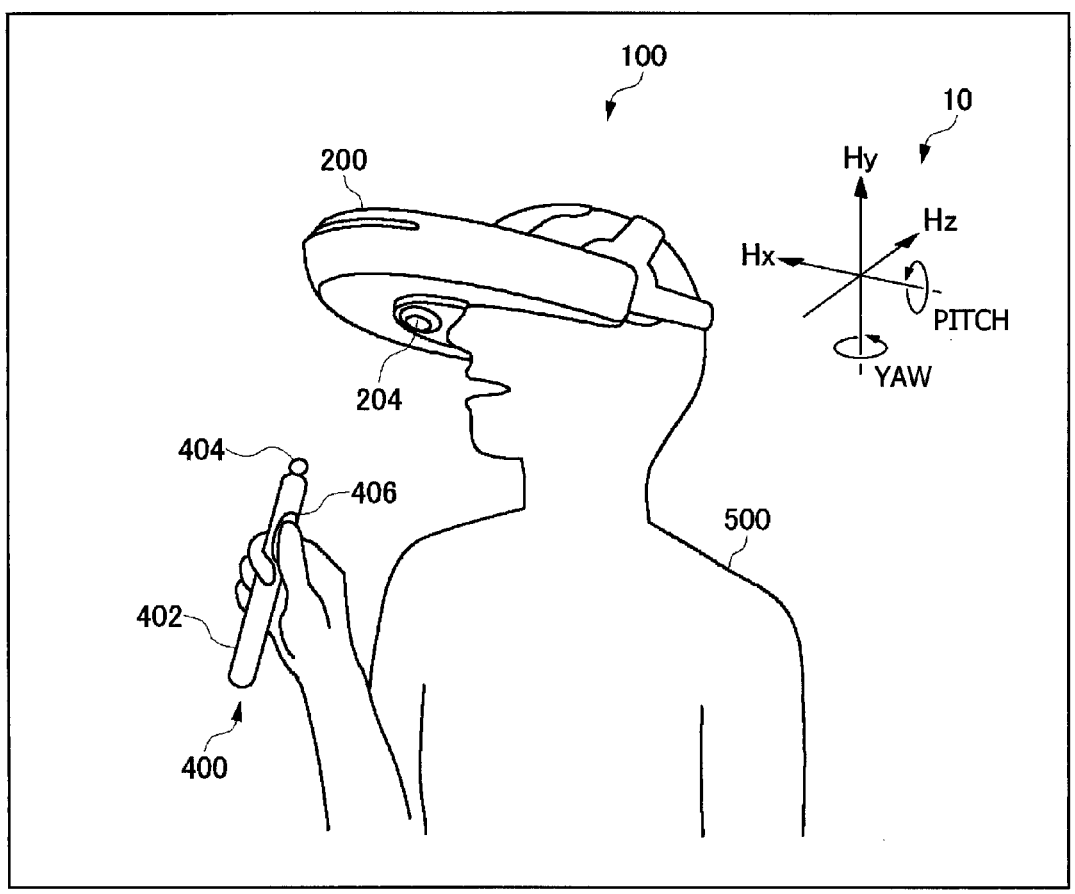
FIG. 7 is a diagram schematically illustrating a scene in which hand tracking of the image presentation system according to the embodiment is used.

FIG. 7 is a diagram schematically illustrating a scene in which hand tracking of the image presentation system 100 according to the embodiment is used. In hand tracking according to the embodiment, the direction of the position specification light-emitting element 404 with respect to the coordinate system 10 (Hx, Hy, Hz) of the head mounted display 200 is acquired as a set of pitch and yaw. The coordinate system 10 shown in FIG. 7 has its origin at the position of the enclosure imaging section 204, with an Hy axis defined to point vertically upward, an Hx axis defined to point from left to right of the head of the user 500, and an Hz axis defined to point from front to back of the head of the user 500. It should be noted that the torso fastened device 300 is not shown in FIG. 7.

Figure 8:
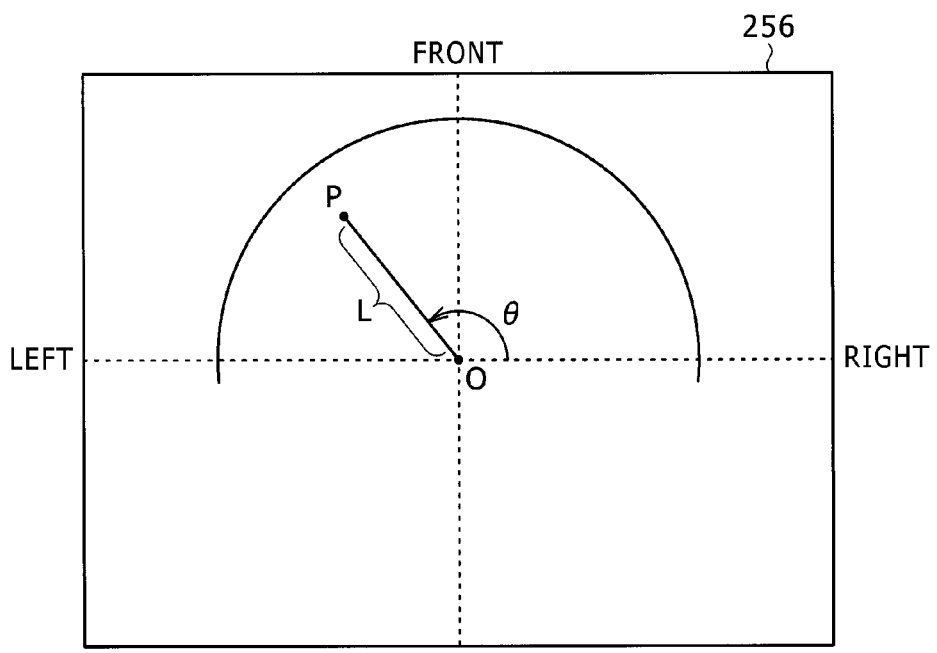
FIG. 8 is a diagram schematically illustrating an example of an image captured by an enclosure imaging section according to the embodiment.

FIG. 8 is a diagram schematically illustrating an example of an image 256 captured by the enclosure imaging section 204 according to the embodiment. In FIG. 8, a point O is the center of the image 256 captured by the enclosure imaging section 204, and a point P is a bright spot derived from the position specification light-emitting element 404. As described earlier, the enclosure imaging section 204 captures an image by equidistant projection via the fisheye lens 234. Therefore, if the position specification light-emitting element 404 is present on the optical axis of the enclosure imaging section 204, the bright spot P is present at the center O of the image 256.

The longer the distance from the position specification light-emitting element 404 to the optical axis of the enclosure imaging section 204, i.e., the longer the perpendicular drawn down from the position specification light-emitting element 404 to the optical axis of the enclosure imaging section 204, the longer the distance between the bright spot P and center O of the image 256. Further, if the position specification light-emitting element 404 is moved while at the same time maintaining the distance from the same element 404 to the optical axis of the enclosure imaging section 204 constant, the bright spot P of the image 256 moves along an arc around the center O.

From the above, it is possible to acquire the pitch of the position specification light-emitting element 404 with respect to the coordinate system 10 by measuring a length L of a radius vector when a line segment OP is the radius vector. Further, it is possible to acquire the yaw of the position specification light-emitting element 404 with respect to the coordinate system 10 by measuring the declination θ of the radius vector.

Figure 9:
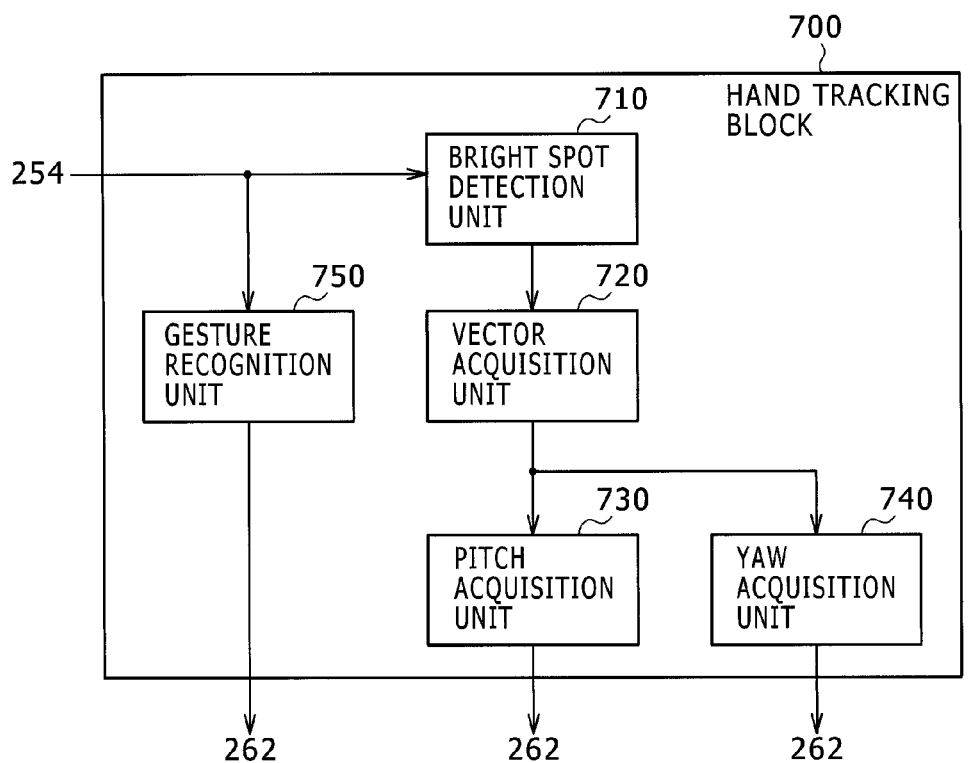
FIG. 9 is a diagram schematically illustrating the functional configuration of a hand tracking block according to the embodiment.

FIG. 9 is a diagram schematically illustrating the functional configuration of the hand tracking block 700 according to the embodiment. The same block 700 includes a bright spot detection unit 710, vector acquisition unit 720, pitch acquisition unit 730, yaw acquisition unit 740 and gesture recognition unit 750.

The bright spot detection unit 710 acquires an image captured by the enclosure imaging section 204 from the second image acquisition block 254. The same unit 710 detects the bright spot P derived from the position specification light-emitting element 404 from the acquired image. As described above, the position specification light-emitting element 404 is switched between being lit at all times and flashing in accordance with the ON/OFF state of the second button 406. Therefore, the bright spot detection unit 710 also detects whether the detected bright spot is lit at all times or flashes, thus detecting whether or not the second button 406 has been pressed, as well. The bright spot detection unit 710 can be implemented, for example, by a known image processing technique such as pattern matching. It should be noted that the process performed by the bright spot detection unit 710 to detect whether or not the second button 406 has been pressed will be described in detail later.

The vector acquisition unit 720 acquires a radius vector having, as an end point, the bright spot P detected by the bright spot detection unit 710, and, as a start point, the center O of the image 256 captured by the enclosure imaging section 204. The pitch acquisition unit 730 acquires the pitch of the position specification light-emitting element 404 with respect to the coordinate system 10 having its origin at the position of the enclosure imaging section 204 from the length L of the radius vector acquired by the vector acquisition unit 720. The yaw acquisition unit 740 acquires the yaw of the position specification light-emitting element 404 with respect to the coordinate system 10 having its origin at the position of the enclosure imaging section 204 from the declination O of the radius vector acquired by the vector acquisition unit 720.

The gesture recognition unit 750 acquires the image captured by the second imaging element 208 provided in the enclosure imaging section 204. As described above, the second imaging element 208 images light in the visible range. The same element 208 images the hand of the user 500, for example, when the user 500 does not have the position specification device 400. The gesture recognition unit 750 recognizes the shape of the hand of the user 500 imaged by the second imaging element 208, outputting this information to the output block 262.

As an example, we assume that the gesture of forming a circle with the thumb and index finger is associated with the ON state of the second button 406, and the clenched first with the OFF state of the same button 406. At this time, if the gesture recognition unit 750 detects the gesture of forming a circle with the thumb and index finger in the image captured by the second imaging element 208, the same unit 750 outputs the same signal as when the bright spot detection unit 710 detects the ON state of the second button 406. Similarly, if the gesture recognition unit 750 detects the clenched first in the image captured by the second imaging element 208, the same unit 750 outputs the same signal as when the bright spot detection unit 710 detects the OFF state of the second button 406.

This makes it possible to acquire the same information as when the user 500 presses the second button 406 even if the user 500 does not have the position specification device 400. The gesture recognition unit 750 may further recognize gestures other than the above. This makes it possible to acquire more information from the user 500 than pressing of the second button 406. The same unit 750 can be implemented by a known image recognition technique such as using pattern recognition based on machine learning. Alternatively, the gesture recognition unit 750 may be used in combination with the position specification device 400. The same unit 750 can recognize the locus of tracking the hand as a gesture by acquiring the image captured by the first imaging element 206 provided in the enclosure imaging section 204.

Figure 10:
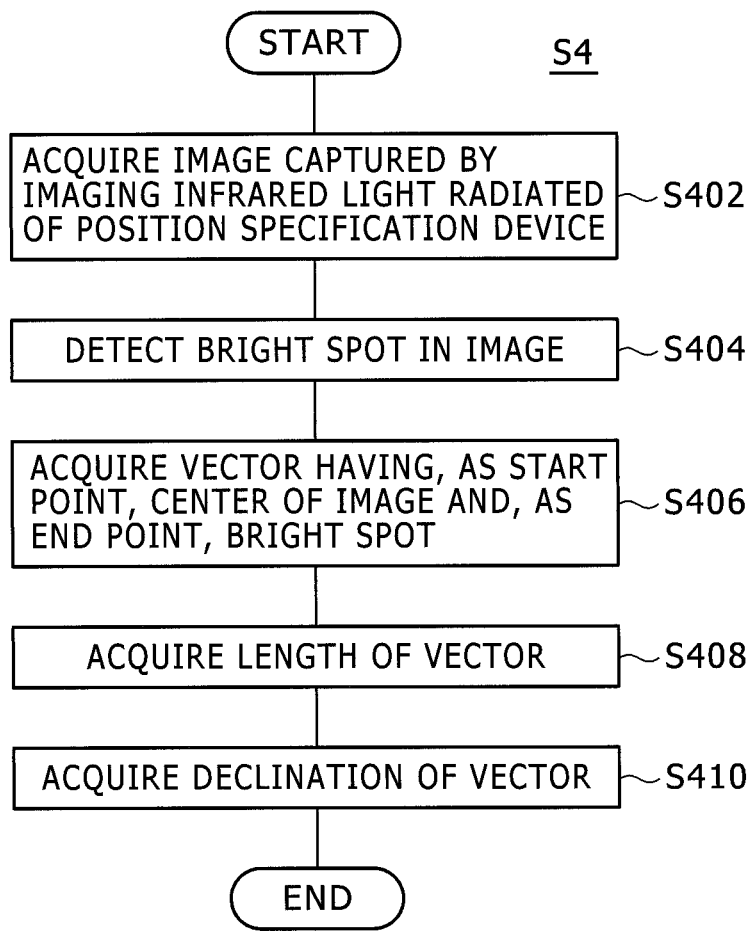
FIG. 10 is a flowchart illustrating the flow of process steps performed by the hand tracking block according to the embodiment.

FIG. 10 is a flowchart illustrating the flow of process steps performed by the hand tracking block according to the embodiment, showing in detail step S4 in FIG. 5.

The second image acquisition block 254 acquires the image captured by the enclosure imaging section 204 by imaging infrared light radiated by the position specification light-emitting element 404 (S402). The bright spot detection unit 710 detects the bright spot derived from infrared light in the image acquired from the second image acquisition block 254 (S404).

The vector acquisition unit 720 acquires a vector having, as an end point, the bright spot detected by the bright spot detection unit 710, and, as a start point, the center of the image captured by the enclosure imaging section 204 (S406). The pitch acquisition unit 730 acquires the length L of the vector acquired by the vector acquisition unit 720 (S408). The yaw acquisition unit 740 acquires the declination O of the vector acquired by the vector acquisition unit 720 (S410).

(Head Tracking)

The hand tracking according to the embodiment has been described above. A description will be given next of the head tracking according to the embodiment.

Figure 11:
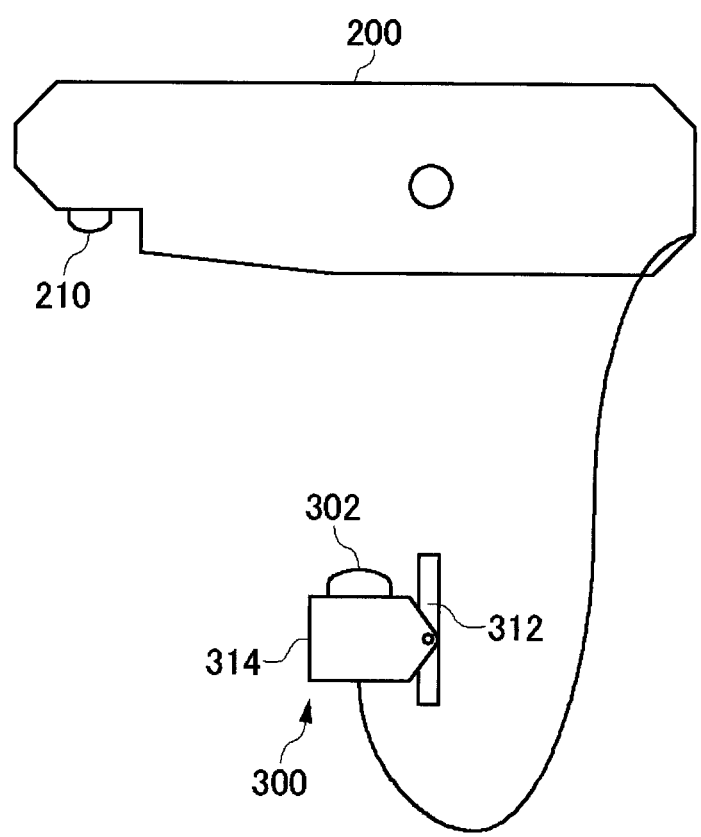
FIG. 11 is a diagram schematically illustrating the outline of the overall configuration of head tracking according to the embodiment.

FIG. 11 is a diagram schematically illustrating the configuration of the image presentation system 100 used for head tracking. As illustrated in FIG. 11, the head mounted display 200 and torso fastened device 300 are used for head tracking according to the embodiment.

Figure 12:
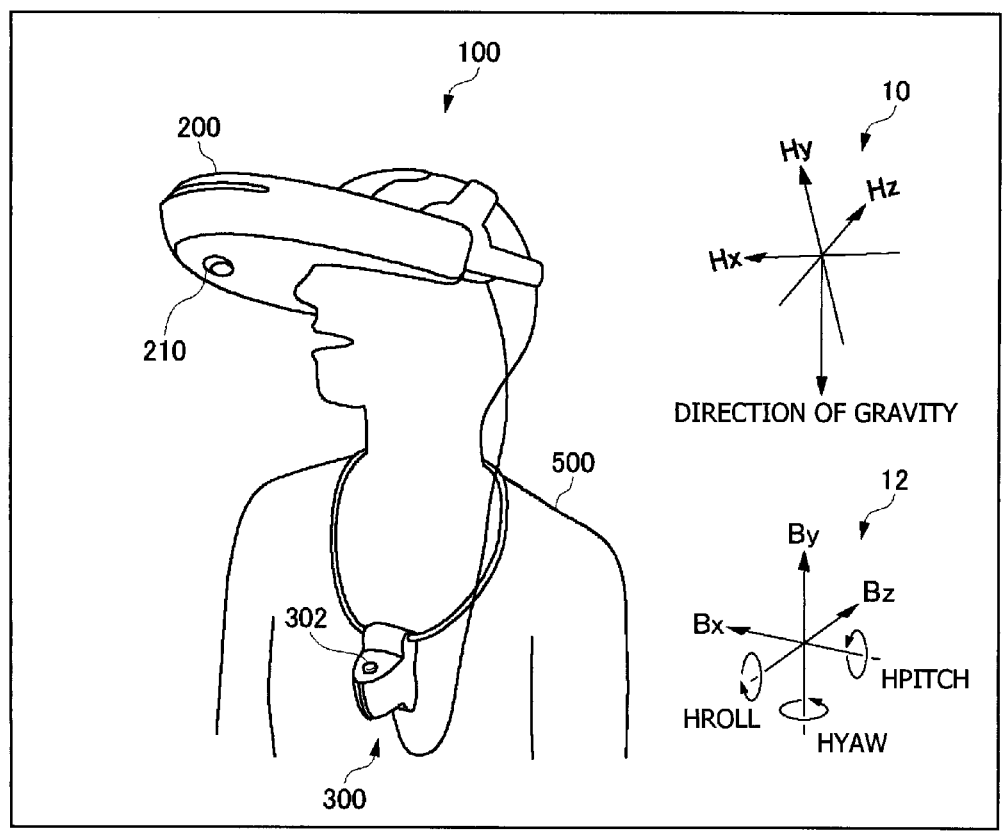
FIG. 12 is a diagram schematically illustrating a scene in which head tracking of the image presentation system according to the embodiment is used.

FIG. 12 is a diagram schematically illustrating a scene in which head tracking of the image presentation system 100 according to the embodiment is used. In head tracking according to the embodiment, the changes in relative posture angles (Hpitch, Hyaw, Hroll) of the coordinate system 10 (Hx, Hy, Hz) of the head mounted display 200 with respect to a coordinate system 12 (Bx, By, Bz) of the torso fastened device 300 are detected. Here, Hpitch represents the pitch of the coordinate system 10 with respect to the coordinate system 12, Hyaw the yaw of the coordinate system 10 with respect to the coordinate system 12, and Hroll the roll of the coordinate system 10 with respect to the coordinate system 12. The changes in the coordinate system 10 of the head mounted display 200 with respect to the coordinate system 12 of the torso fastened device 300 correspond to the positional changes of the head of the user 500 with respect to his or her torso.

The coordinate system 12 shown in FIG. 12 has its origin at the position of the torso imaging element 302 with a By axis defined to point vertically upward, a Bx axis defined to point from left to right of the user 500, and a Bz axis defined to point from front to back of the user 500. It should be noted that the position specification device 400 is not shown in FIG. 12.

In the coordinate system 12 of the torso fastened device 300, the By axis is parallel to the direction of gravity, whereas the Bx and Bz axes are perpendicular to the direction of gravity. Similarly, if the user 500 is faced forward, the Hy axis of the coordinate system 10 of the head mounted display 200 is parallel to the direction of gravity, whereas the Hx and Hz axes are perpendicular to the direction of gravity.

As shown by the coordinate system 12 of the torso fastened device 300, if the user 500 moves his or her head up or down, that is, if he or she looks down at the floor or looks up at the ceiling, the pitch of the coordinate system 10 of the head mounted display 200 changes with respect to the coordinate system 12. Further, if the user 500 tilts his or her head to the left or right, that is, if he or she inclines the head to one side, the roll of the coordinate system 10 of the head mounted display 200 changes with respect to the coordinate system 12. In the event of a change in pitch or roll of the coordinate system 10 with respect to the coordinate system 12, the Hx and Hz axes of the coordinate system 10 deviate from the perpendicular to the direction of gravity. It is possible to detect the pitch or roll of the coordinate system 10 with respect to the coordinate system 12 by detecting this "deviation" using the acceleration sensor 224 shown in FIG. 3.

In contrast, it is difficult to detect the change in yaw of the coordinate system 10 with respect to the coordinate system 12 from the change in direction of gravity. For example, if the user 500 faces to the left or right while at the same time maintaining his or her neck upright, the yaw of the coordinate system 10 changes with respect to the coordinate system 12. However, the Hy axis of the coordinate system 10 does not change, remaining parallel to the direction of gravity. Therefore, the image presentation system 100 according to the embodiment detects the change in yaw of the coordinate system 10 with respect to the coordinate system 12 by imaging light radiated by the enclosure light-emitting element 210 with the torso imaging element 302 and analyzing the image. A description will be given below of the principle behind the detection of the change in yaw of the coordinate system 10 with respect to the coordinate system 12 from the image captured by the torso imaging element 302.

Figure 13:
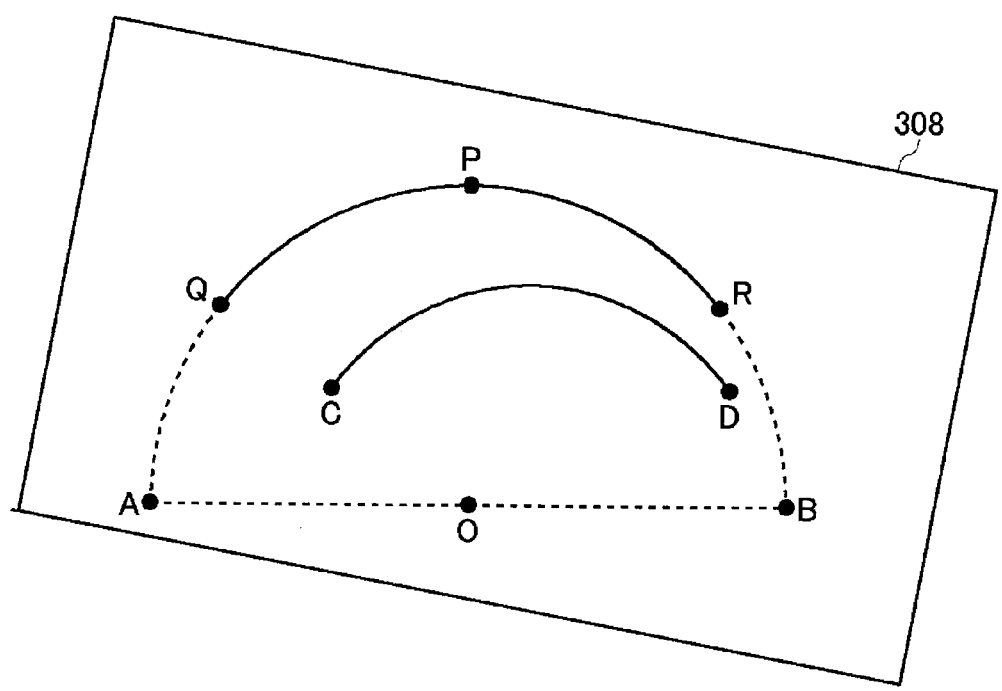
FIG. 13 is a diagram schematically illustrating an example of an image captured by a torso imaging section according to the embodiment.

FIG. 13 is a diagram schematically illustrating an example of an image 308 captured by the torso imaging section 302 according to the embodiment. More specifically, FIG. 13 illustrates the locus of the bright spot derived from the enclosure light-emitting element 210 when the user 500 is faced forward with the head mounted display 200 on and rotates the neck to the left and right. In general, the angle by which a human can rotate his neck to the left and right is said to be about 60 degrees in both directions. Therefore, if the user 500 is faced forward with the head mounted display 200 on and rotates the neck to the left and right, the locus of the bright spot derived from the enclosure light-emitting element 210 is an arc of a sector whose central angle is about 120 degrees.

In FIG. 13, the point P represents the bright spot derived from the enclosure light-emitting element 210 when the user 500 is faced forward. A point Q represents the bright spot derived from the enclosure light-emitting element 210 when the user 500 rotates the neck to the right as much as possible. Further, a point R represents the bright spot derived from the enclosure light-emitting element 210 when the user 500 rotates the neck to the left as much as possible. Assuming that the locus of the bright spot derived from the enclosure light-emitting element 210 traces an arc, the points P, Q and R are present on the same circumference. In general, a circle passing through three points are uniquely determined. Therefore, the above arc can be identified by detecting the points P, Q and R.

Here, if the user 500 rotates his or her neck to the left and right with the neck bent forward and backward, the radius of the circle traced by the locus of the bright spot derived from the enclosure light-emitting element 210 in the image 308 is shorter than when the user 500 is faced forward. The reason for this is that when the user 500 bends his or her neck forward or backward, the enclosure light-emitting element 210 is closer to the neck of the user 500 which serves as an axis of rotation.

An arc CD in FIG. 13 illustrates the locus of the neck of the user 500 when the user 500 rotates his or her neck to the left and right with the neck bent forward and backward. From this, the inventor of the present application has discovered that a "presence area of the enclosure light-emitting element 210" is present where a bright spot derived from the enclosure light-emitting element 210 is likely to be present in the image 308. More specifically, this area is an area surrounded by an arc that passes through the points P, Q and R and has a central angle of 180 degrees in FIG. 13. The presence area of the enclosure light-emitting element 210 is an area surrounded by a line segment AB and arc AB in FIG. 13. It should be noted that the point O in FIG. 13 is the center of the arc.

As described above, the torso fastened device 300 includes the torso imaging element 302 and the element support section 314 adapted to support the same element 302. Further, the element support section 314 also includes the adjustment section 312 adapted to adjust the tilt of the torso imaging element 302. When using the image presentation system 100, the user 500 performs calibration designed to adjust the tilt of the torso imaging element 302 using the adjustment section 312 in such a manner that the "presence area of the enclosure light-emitting element 210" is included in the image 308 captured by the torso imaging element 302. This provides a higher likelihood that a bright spot derived from the enclosure light-emitting element 210 is present in the image 308.

Figure 14:
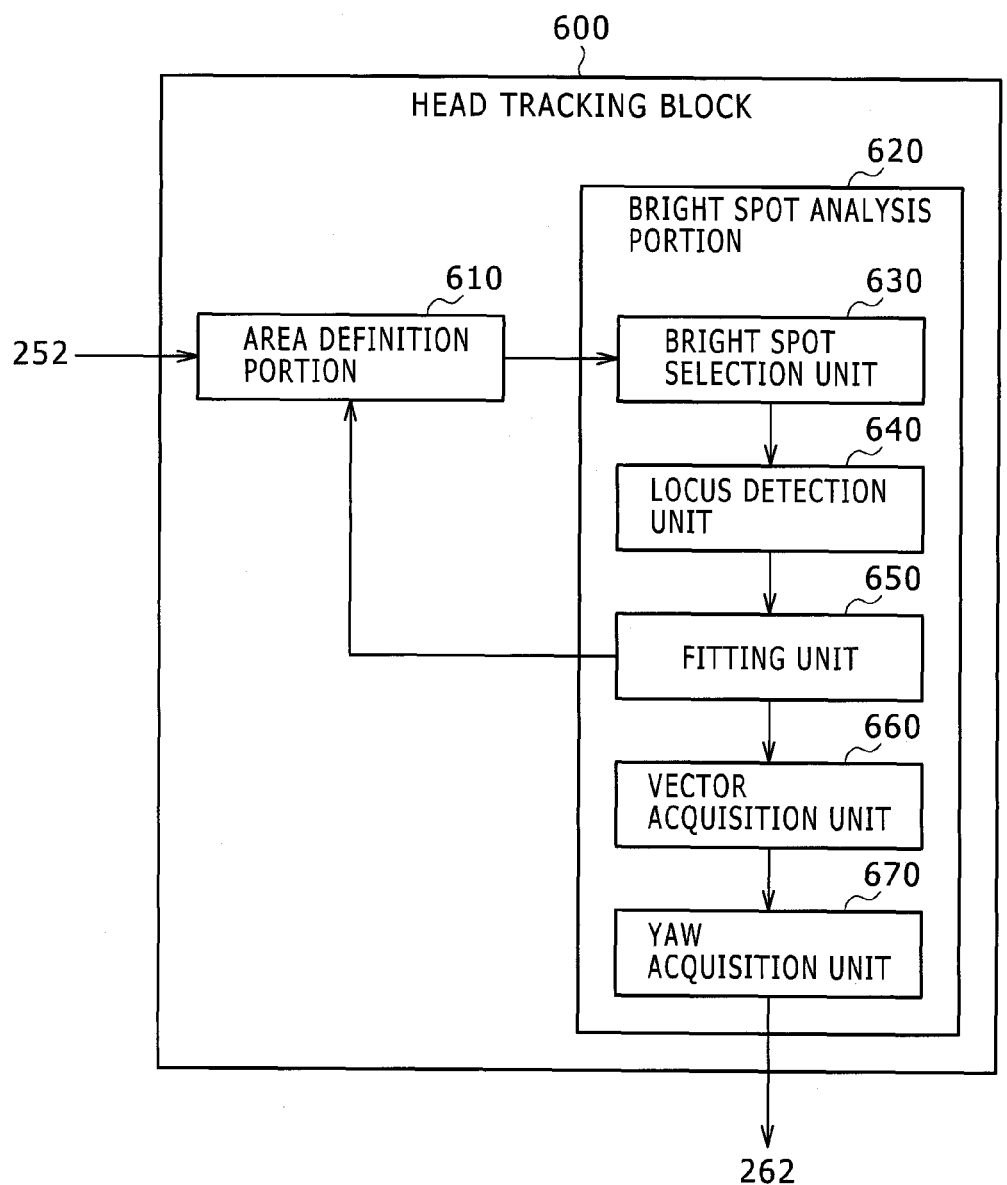
FIG. 14 is a diagram schematically illustrating the functional configuration of a head tracking block according to the embodiment.

FIG. 14 is a diagram schematically illustrating the functional configuration of the head tracking block 600 according to the embodiment. The head tracking block 600 according to the embodiment includes an area definition portion 610 and bright spot analysis portion 620. The area definition portion 610 acquires the image 308 captured by the torso imaging element 302 from the first image acquisition block 252. The same portion 610 defines a presence area of the enclosure light-emitting element 210 in the image 308 if the "presence area of the enclosure light-emitting element 210" has already been determined.

The bright spot analysis portion 620 detects the yaw of the enclosure light-emitting element 210 with respect to the torso imaging element 302 by analyzing the image 308. A detailed description will be given below of the bright spot analysis portion 620.

The bright spot analysis portion 620 includes a bright spot selection unit 630, locus detection unit 640, fitting unit 650, vector acquisition unit 660 and yaw acquisition unit 670. The bright spot selection unit 630 selects, if a plurality of bright spots are present in the image 308, the bright spot derived from the enclosure light-emitting element 210 from among the plurality of bright spots.

A case in which a plurality of bright spots are present in the image 308 is probably a case in which a bright spot derived, for example, from the position specification light-emitting element 404 is present in addition to that derived from the enclosure light-emitting element 210. The selection process performed by the bright spot selection unit 630 will be described in detail later.

The locus detection unit 640 detects the locus of the bright spot selected by the bright spot selection unit 630 in the image 308 captured by the torso imaging element 302. The fitting unit 650 acquires the arc that fits the locus detected by the locus detection unit 640. The same unit 650 outputs the acquired arc to the area definition portion 610 as a presence area of the enclosure light-emitting element 210 during calibration adapted to adjust the tilt of the torso imaging element 302.

The vector acquisition unit 660 acquires a radius vector having, as a start point, the center of the arc acquired by the fitting unit 650 and, as an end point, the bright spot selected by the bright spot selection unit 630. The yaw acquisition unit 670 detects the yaw of the enclosure light-emitting element 210 with respect to the torso imaging element 302 by acquiring the declination of the radius vector acquired by the vector acquisition unit 660 as does the yaw acquisition unit 740 provided in the hand tracking block 700.

Figure 15:
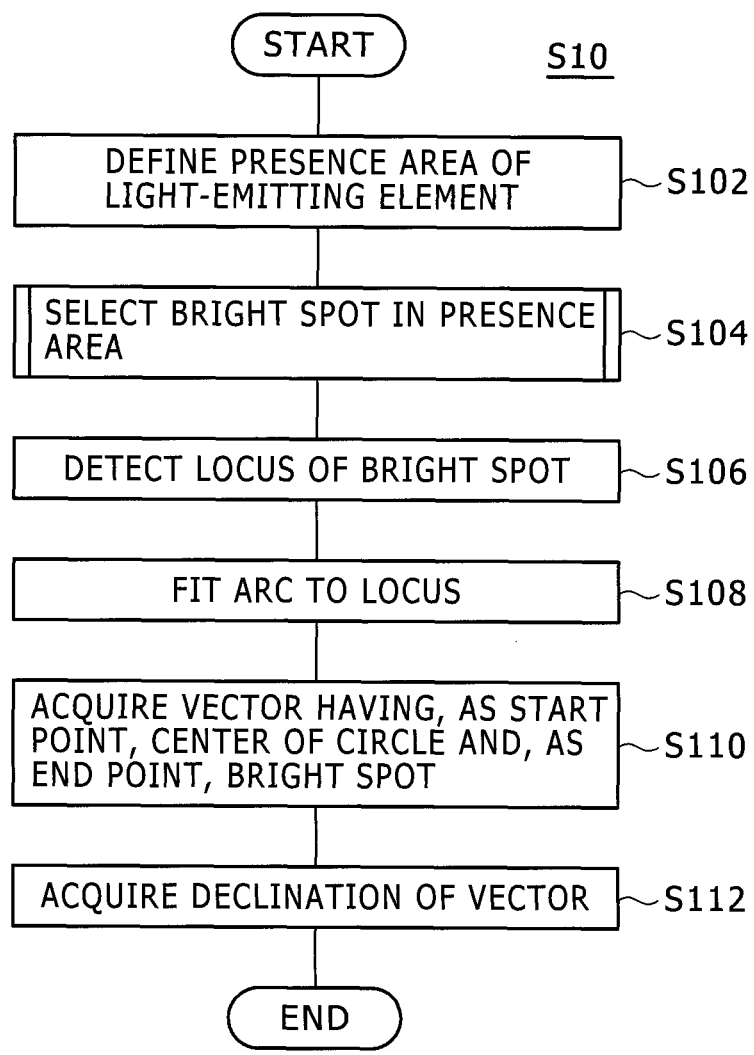
FIG. 15 is a flowchart illustrating the flow of process steps performed by the head tracking block according to the embodiment.

FIG. 15 is a flowchart illustrating the flow of the head tracking process according to the embodiment, showing in detail step S10 in FIG. 5.

The area definition portion 610 defines a presence area of the enclosure light-emitting element 210 in the image 308 captured by the torso imaging element 302 (S102). The bright spot selection unit 630 identifies the bright spot derived from the enclosure light-emitting element 210 if a plurality of bright spots are present in the area defined by the area definition portion 610 (S104). The locus detection unit 640 detects the locus of the bright spot selected by the bright spot selection unit 630 in the image 308 captured by the torso imaging element 302 (S106).

The fitting unit 650 acquires the arc that fits the locus detected by the locus detection unit 640 (S108). The vector acquisition unit 660 acquires a radius vector having, as a start point, the center of the arc acquired by the fitting unit 650 and, as an end point, the bright spot selected by the bright spot selection unit 630 (S110). The yaw acquisition unit 670 acquires the declination of the radius vector acquired by the vector acquisition unit 660 (S112).

(Using Hand Tracking and Head Tracking in Combination)

The head tracking according to the embodiment has been described above. A description will be given next of a case in which the hand tracking and head tracking according to the embodiment are used in combination.

(Positional Relationship between the Enclosure Light-Emitting Element 210 and Enclosure Imaging Section 204)

Figure 16:
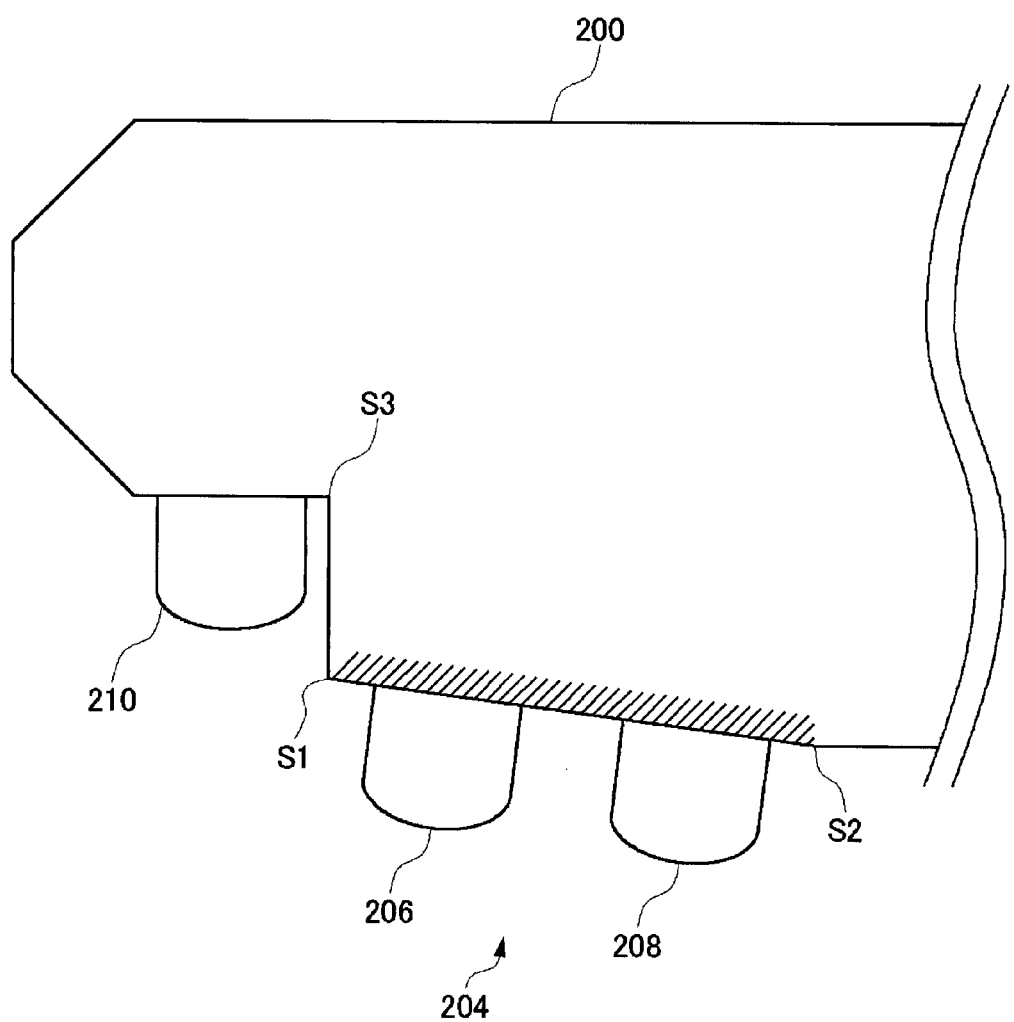
FIG. 16 is a diagram illustrating a partially enlarged view of the head mounted display according to the embodiment.

FIG. 16 is a diagram illustrating a partially enlarged view of the head mounted display 200 according to the embodiment, showing the positional relationship between the enclosure light-emitting element 210 and enclosure imaging section 204.

As described above, the first and second imaging elements 206 and 208 of the enclosure imaging section 204 are provided on the sloped area of the enclosure of the head mounted display 200. In FIG. 16, the sloped area is indicated by a line segment connecting reference numerals S1 and S2 and oblique lines. Here, the enclosure imaging section 204 is designed to image the position specification light-emitting element 404. Therefore, it is preferred that the same section 204 should not image light radiated by the enclosure light-emitting element 210 used for head tracking.

For this reason, the enclosure of the head mounted display 200 allows shielding between the enclosure imaging section 204 and enclosure light-emitting element 210. More specifically, at least part of the enclosure is present between the enclosure imaging section 204 and enclosure light-emitting element 210 as shown by reference numerals S1 and S2 in FIG. 16. This decreases the chance of light radiated by the enclosure light-emitting element 210 falling within the angle of view of the enclosure imaging section 204 or at least within the presence area of the enclosure light-emitting element 210 defined by the area definition portion 610.

Further, as described above, the enclosure light-emitting element 210 is designed to detect the change in yaw of the coordinate system 10 of the head mounted display 200 with respect to the coordinate system 12 of the torso fastened device 300. Here, although the fitting unit 650 performs circular fitting when detecting the change in yaw, in general, the larger the radius of the circle to be fitted, the higher the fitting accuracy. Therefore, it is preferred that the enclosure light-emitting element 210 should be located as far away from the head of the user 500 as possible when the user 500 wears the head mounted display 200.

For this reason, the enclosure light-emitting element 210 is installed more forward in the direction of line of sight of the user 500 than the enclosure imaging section 204 when the head mounted display 200 is worn on the head of the user 500. Further, because at least part of the enclosure is present between the enclosure imaging section 204 and enclosure light-emitting element 210, the same element 210 is installed more vertically upward than the enclosure imaging section 204. This provides a larger radius of the arc traced by the locus of the bright spot derived from the enclosure light-emitting element 210 in the image 308 captured by the torso imaging element 302, thus contributing to improved accuracy in circular fitting performed by the fitting unit 650.

(Bright Spot Selection)

A description will be given next of the bright spot selection process performed by the bright spot selection unit 630.

As described above, the bright spot analysis portion 620 detects the motion of the enclosure light-emitting element 210 by analyzing the motion of the bright spot in the presence area of the enclosure light-emitting element 210 defined by the area definition portion 610. However, if a plurality of bright spots are present in the presence area of the enclosure light-emitting element 210, the bright spot derived from the same element 210 is selected first from among the plurality of bright spots. For example, if hand tracking and head tracking are used in combination, it is likely that a bright spot derived from the position specification light-emitting element 404 may appear in the presence area of the enclosure light-emitting element 210.

The bright spot selection unit 630 selects a bright spot derived from the enclosure light-emitting element 210 based on the sizes of the plurality of bright spots detected in the presence area of the enclosure light-emitting element 210 defined in the image 308 by the torso imaging element 302.

Light radiated by the position specification light-emitting element 404 falls within the angle of view of the torso imaging element 302 probably when the user 500 moves the position specification device 400 between the head mounted display 200 and torso imaging element 302. In this case, the distance from the torso imaging element 302 to the enclosure light-emitting element 210 is longer than that from the torso imaging element 302 to the position specification light-emitting element 404. Here, the enclosure light-emitting element 210 according to the embodiment has the same size as the position specification light-emitting element 404. Therefore, if a bright spot derived from the enclosure light-emitting element 210 and another derived from the position specification light-emitting element 404 are present at the same time in the presence area of the enclosure light-emitting element 210, the bright spot derived from the enclosure light-emitting element 210 is smaller than that derived from the position specification light-emitting element 404.

For this reason, the bright spot selection unit 630 compares the plurality of bright spots detected in the presence area of the enclosure light-emitting element 210 in terms of size, selecting the smallest one as a bright spot derived from the enclosure light-emitting element 210. This makes it possible to identify a bright spot derived from the enclosure light-emitting element 210 from among a plurality of bright spots in the presence area of the enclosure light-emitting element 210.

Figure 17:
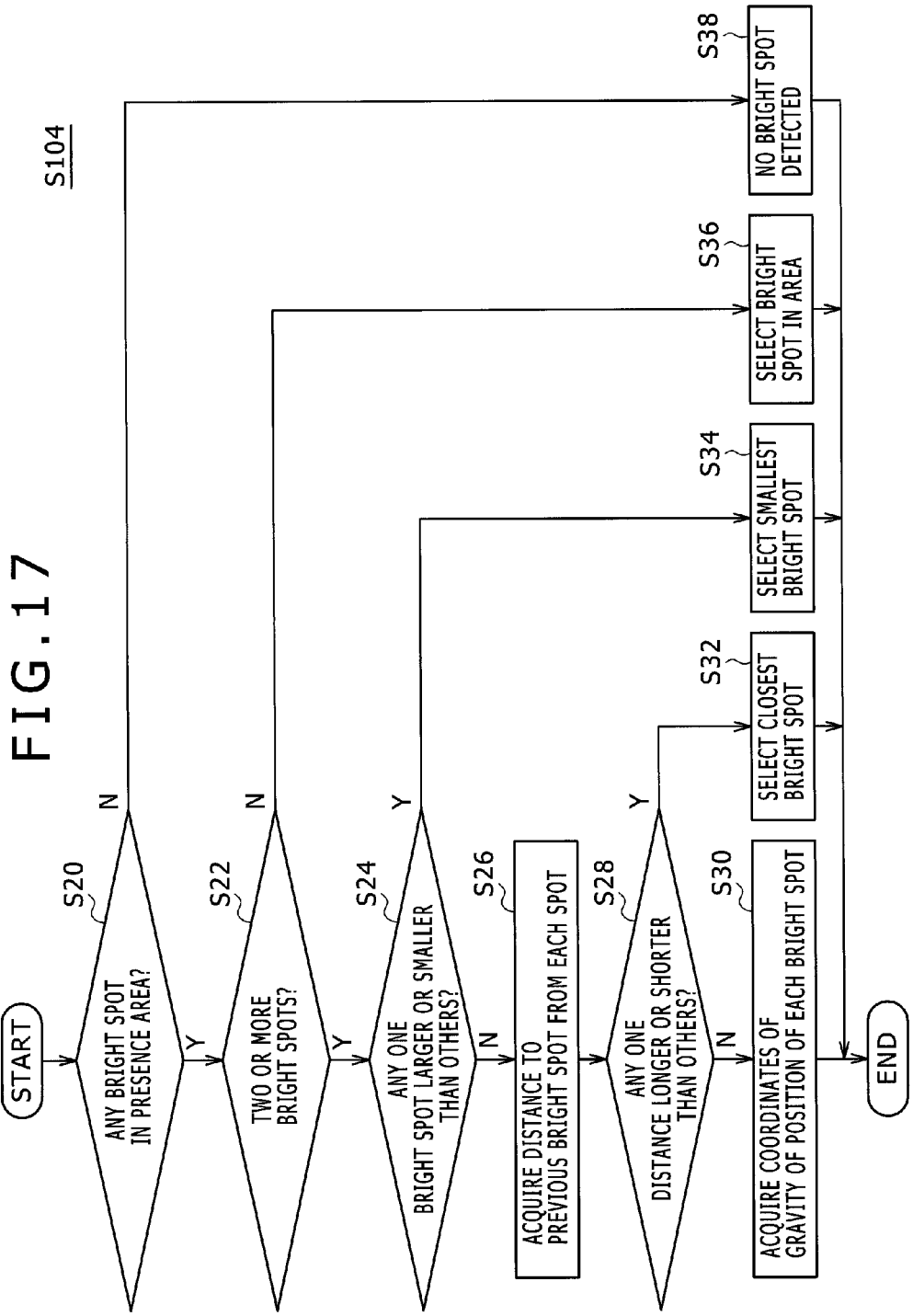
FIG. 17 is a flowchart illustrating the flow of a bright spot selection process performed by a bright spot selection unit according to the embodiment.

FIG. 17 is a flowchart illustrating the flow of the bright spot selection process performed by the bright spot selection unit 630 according to the embodiment, showing in detail step S104 in FIG. 15.

The bright spot selection unit 630 investigates whether a bright spot is present in the presence area of the enclosure light-emitting element 210 defined by the area definition portion 610. If no bright spot is present (N in S20), the same unit 630 determines that a bright spot has yet to be detected (S38). When a bright spot is present (Y in S20), the bright spot selection unit 630 investigates whether or not two or more bright spots are present in the presence area of the enclosure light-emitting element 210. If two or more bright spots are not present, that is, only one bright spot is present (N in S22), the bright spot selection unit 630 selects the detected bright spot as a bright spot derived from the enclosure light-emitting element 210 (S36).

When two or more bright spots are present (Y in S22), the bright spot selection unit 630 investigates the size relationship between the detected bright spots. When one is larger or smaller than the other or others (Y in S24), the same unit 630 selects the smallest bright spot as a bright spot derived from the enclosure light-emitting element 210 (S34). If none is larger or smaller than the other or others (N in S24), the bright spot selection unit 630 finds the distance from the position of the bright spot selected previously as a bright spot derived from the enclosure light-emitting element 210 to each of the bright spots. When one distance is longer or shorter than the other or others (Y in S28), the same unit 630 selects the bright spot closest to the previous one as a bright spot derived from the enclosure light-emitting element 210 (S32).

If none of the found distances is longer or shorter than the other or others (N in S28), the bright spot selection unit 630 acquires the coordinates of gravity of the position of each bright spot and considers that a bright spot derived from the enclosure light-emitting element 210 is present at that coordinate position (S30).

(Detection of Signal from the Position Specification Device 400)

The bright spot selection process by the bright spot selection unit 630 has been described above. A description will be given next of the detection process performed by the bright spot detection unit 710 to detect whether or not the second button 406 of the position specification device 400 has been pressed.

As described above, the position specification light-emitting element 404 is lit at all times when the second button 406 is ON, and flashes at the flashing frequency F when the second button 406 is OFF. The bright spot selection unit 630 detects whether or not the second button 406 has been pressed by analyzing the presence or absence of a bright spot derived from the position specification light-emitting element 404 in the image 256 captured by the enclosure imaging section 204.

More specifically, the enclosure imaging section 204 analyzes the image 256 acquired by imaging performed at least at a frequency 2F, twice the flashing frequency F of the position specification light-emitting element 404. It is known that as the same section 204 captures the image 256 at least at twice the flashing frequency F of the position specification light-emitting element 404 and analyzes the image 256 which is worth two continuous frames, the bright spot detection unit 710 can identify whether the position specification light-emitting element 404 is lit at all times or flashes at the frequency F (period T=1/F) or whether no bright spot is present in the image 256. The flashing frequency F is, for example, 120[Hz] although it may be determined experimentally in consideration of factors such as time resolution of the enclosure imaging section 204. In this case, when the second button 406 is OFF, the position specification light-emitting element 404 repeatedly lights up and goes out every ¹⁄₂₄₀ of a second. On the other hand, the enclosure imaging section 204 captures the subject including the position specification light-emitting element 404 at least at 240 [Hz].

Figure 18:
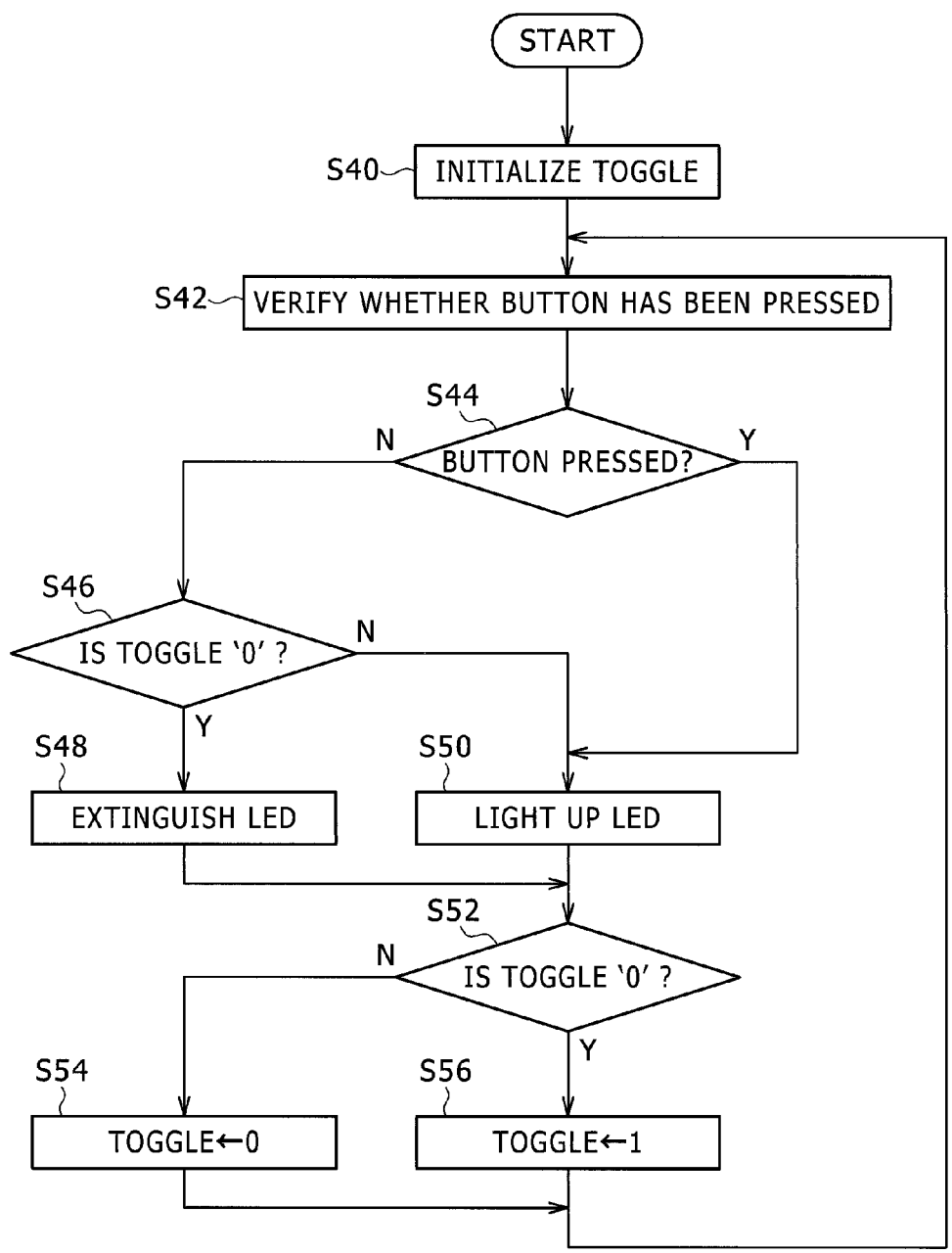
FIG. 18 is a flowchart illustrating the flow of detection of a signal issued by a position specification device according to the embodiment.

FIG. 18 is a flowchart illustrating the flow of detection of a signal issued by the position specification device 400 according to the embodiment, showing the manner in which the position specification light-emitting element 404 is controlled.

The I/O control section 408 provided in the position specification device 400 initializes a toggle (S40). Here, the term "toggle" refers to a binary value indicating whether the second LED is to light up or go out when the second button 406 is not pressed. In the embodiment, the toggle is inverted every ¹⁄₂₄₀ of a second and stored in a temporary storage section of the I/O control section 408 which is not shown.

The I/O control section 408 verifies the ON/OFF state of the second button 406 (S42). When the second button 406 has been pressed (Y in S44), the same section 408 lights up the second LED 410, the position specification light-emitting element 404 (S50). If the second button 406 has not been pressed (N in S44), and if the toggle is not '0' (N in S46), the I/O control section 408 also lights up the second LED 410, the position specification light-emitting element 404 (S50).

If the second button 406 has not been pressed (N in S44), and if the toggle is '0' (Y in S46), the I/O control section 408 extinguishes the second LED 410, the position specification light-emitting element 404 (S48). Later, when the toggle is '0' (Y in S52), the I/O control section 408 inverts the toggle to '1' (S56). If the toggle is not '0' (N in S52), the same section 408 inverts the toggle to '0' (S56). After the toggle has been inverted, the I/O control section 408 returns to step S42 to repeat the above steps.

The I/O control section 408 repeats the above steps from step S42 to S54 and S56, for example, every ¹⁄₂₄₀ of a second. This makes it possible for the same section 408 as a whole to cause the second LED 410 to flash at intervals of 120 [Hz] when the second button 406 is OFF and lights up the second LED 410 continuously when the second button 406 is ON.

Figure 19:
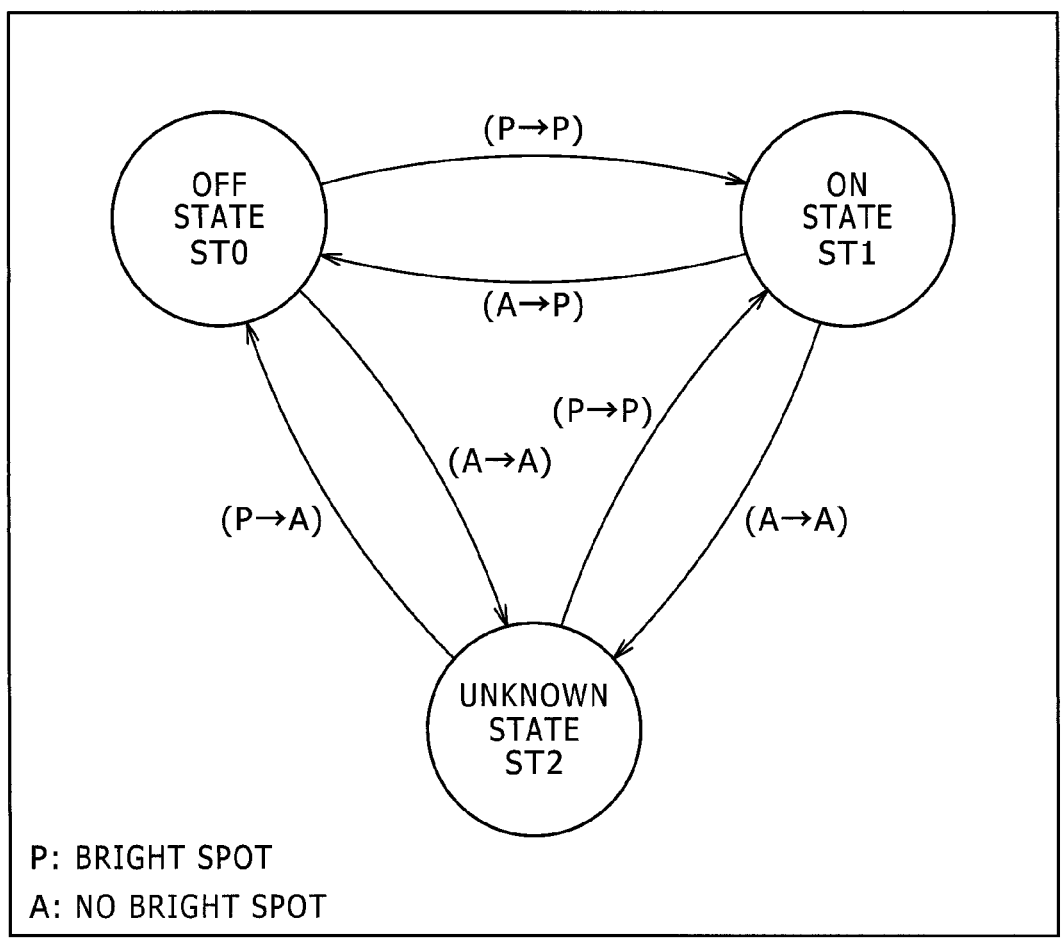
FIG. 19 is a state transition diagram illustrating the internal condition of the bright spot detection unit when a signal issued by the position specification device according to the embodiment is detected.

FIG. 19 is a state transition diagram illustrating the internal condition of the bright spot detection unit 710 when a signal issued by the position specification device 400 according to the embodiment is detected, describing the detection process performed by the bright spot detection unit 710.

The bright spot detection unit 710 detects a signal issued by the position specification device 400 based on the image captured by the enclosure imaging section 204 and changes the value of a "pressing flag" in accordance with a detected signal during detection. Here, the term "pressing flag" refers to a work memory used to detect the presence or absence of a bright spot derived from the position specification light-emitting element 404 and to detect the ON/OFF state of the second button 406 when a bright spot is detected. This pressing flag is incorporated in the storage section 212.

More specifically, the bright spot detection unit 710 acquires the image 256 captured by the enclosure imaging section 204 frame by frame for analysis. When detecting that the bright spot derived from the position specification light-emitting element 404 flashes, that is, when recognizing that the second button 406 is OFF, the bright spot detection unit 710 sets the pressing flag to '0.' On the other hand, when detecting that the bright spot derived from the position specification light-emitting element 404 is lit at all times, that is, when recognizing that the second button 406 is ON, the bright spot detection unit 710 sets the pressing flag to '1.' Further, when detecting no bright spot derived from the position specification light-emitting element 404 in the image captured by the enclosure imaging section 204, the bright spot detection unit 710 sets the pressing flag to '2.'

Here, the value of the pressing flag is associated with the internal condition of the bright spot detection unit 710. That is, when the pressing flag is '0,' the same unit 710 is in the OFF state (ST0). Further, when the pressing flag is '1,' the same unit 710 is in the ON state (ST1). When the pressing flag is '2,' the same unit 710 is in an unknown state (ST2). The bright spot detection unit 710 analyzes two continuous frames of the image 256 captured by the enclosure imaging section 204, changing its internal condition in accordance with the analysis result.

We assume, for example, that when the internal condition of the bright spot detection unit 710 is the ON state (ST0), the same unit 710 detects a bright spot derived from the position specification light-emitting element 404 in both of the two continuous frames of the image 256. In this case, the same unit 710 changes the pressing flag from '0' to '1,' causing the internal condition to make a transition to the ON state ST1. The reason for this is that when a bright spot is detected in both of the two continuous frames of the image 256, it is highly likely that the bright spot is lit at all times.

In FIG. 19, the above transition is represented by the arrow pointing from the OFF state ST0 to the ON state ST1 and "(P→P)." Here, reference numeral P represents the presence of a bright spot in the image 256 and is the first letter of the word "Present." "(P→P)" represents an event in which a bright spot is detected in the first and next images 256.

We assume that when the internal condition of the bright spot detection unit 710 is the ON state (ST1), the same unit 710 does not detect any bright spot in the first frame of the image 256, but does so in the next frame thereof. In this case, the same unit 710 changes the pressing flag from '1' to '0,' causing the internal condition to make a transition to the OFF state ST0. In FIG. 19, the above transition is represented by the arrow pointing from the ON state ST1 to the OFF state ST0 and event (A→P). Here, reference numeral A represents the absence of a bright spot in the image 256 and is the first letter of the word "Absent." An event (A→P) represents that a bright spot is not detected in the first image 256, but is done so in the next image 256. The same applies hereinafter. An event (A→A) represents that no bright spot is detected in either of the two continuous frames of the image 256, and an event (P→A) represents that a bright spot is detected in the first image 256, but not in the next image 256.

Similarly, if the event (A→A) occurs when the internal condition of the bright spot detection unit 710 is the ON state (ST1), the bright spot detection unit 710 changes the pressing flag from '1' to '2,' causing the internal condition to make a transition to the unknown state ST2. If no bright spot is detected in either of the two continuous frames of the image 256, no bright spot is present in the image 256, making it highly likely that the bright spot detection unit 710 has lost track of a bright spot. If the event (P→P) occurs when the internal condition of the bright spot detection unit 710 is the unknown state (ST2), the bright spot detection unit 710 changes the pressing flag from '2' to '1,' causing the internal condition to make a transition to the ON state ST1.

If the event (P→A) occurs when the internal condition of the bright spot detection unit 710 is the unknown state (ST2), the bright spot detection unit 710 changes the pressing flag from '2' to '0,' causing the internal condition to make a transition to the OFF state ST0. Further, if the event (A→A) occurs when the internal condition of the bright spot detection unit 710 is the OFF state (ST0), the bright spot detection unit 710 changes the pressing flag from '0' to '2,' causing the internal condition to make a transition to the unknown state ST2.

Thus, the bright spot detection unit 710 can detect the presence or absence of a bright spot derived from the second button 406 and, if it does, can identify the ON/OFF state of the second button 406.

As described above, the image presentation system 100 according to the embodiment provides a technology for detecting the motion of the user wearing a head mounted display.

Thus, the present disclosure has been described based on an embodiment thereof. The above embodiment is illustrative, and it is understood by those skilled in the art that the combination of the components and processes can be modified in various ways, and that these modification examples are also within the scope of the present disclosure.

First Modification Example

A case has been described above in which the bright spot selection unit 630 selects a bright spot derived from the enclosure light-emitting element 210 based on the sizes of a plurality of bright spots detected in a presence area of the enclosure light-emitting element 210 defined in the image 308 captured by the torso imaging element 302. However, the method of the bright spot selection performed by the bright spot selection unit 630 is not limited thereto. In addition to the above, a bright spot may be selected by taking advantage of the difference in wavelength of light radiated by the light-emitting element, the source of the bright spot. A description will be given below of this method.

Light radiated by the enclosure light-emitting element 210 according to a first modification example differs in wavelength from that radiated by the position specification light-emitting element 404. For this reason, the torso imaging element 302 achieves imaging using an optical filter having a higher transmittance of light radiated by the enclosure light-emitting element 210 than that radiated by the position specification light-emitting element 404. As a result, even if a bright spot derived from the enclosure light-emitting element 210 and another derived from the position specification light-emitting element 404 are present in a presence area of the enclosure light-emitting element 210, these bright spots differ in brightness.

More specifically, if the torso imaging element 302 captures an image, for example, in such a manner that the greater the amount of light, the higher the brightness, the bright spot derived from the enclosure light-emitting element 210 is higher in brightness than that derived from the position specification light-emitting element 404 because light radiated by the position specification light-emitting element 404 is attenuated by the optical filter. For this reason, the bright spot selection unit 630 compares the two bright spots in the image in terms of brightness, selecting the one with higher brightness as a bright spot derived from the enclosure light-emitting element 210.

Second Modification Example

A case has been described above in which the bright spot selection unit 630 selects a bright spot closest to the previous one as a bright spot derived from the enclosure light-emitting element 210. However, if a bright spot derived from the enclosure light-emitting element 210 was detected before, the current position of the bright spot may be predicted from the position of the bright spot detected before. This can be accomplished, for example, by sampling the declination of the radius vector acquired by the yaw acquisition unit 670 and estimating the angular velocity of the bright spot. As described above, a bright spot derived from the enclosure light-emitting element 210 can be predicted by tracing an arc-shaped locus. Therefore, the current position of the bright spot can be estimated with high accuracy from its previous position and angular velocity.

The second modification example is advantageous in that it can estimate a bright spot derived from the enclosure light-emitting element 210 with high accuracy even if light emitted, for example, by a remote control of a television set is close in wavelength to light radiated by the enclosure light-emitting element 210 unlike the above case in which an optical filter is used.

Third Modification Example

A case has been described above in which the enclosure imaging section 204 includes the first imaging element 206 adapted to image light in the invisible range such as infrared light and the second imaging element 208 adapted to image light in the visible range. However, the enclosure imaging section 204 may include a single imaging element capable of imaging light in the visible and invisible ranges at the same time. This contributes to a reduced weight of the head mounted display 200, thus ensuring less burden on the user 500 wearing the same display 200.

It should be noted that the disclosure according to the embodiment may be identified by the features given below.
(Feature 1-1)
A head mounted display including:
an enclosure accommodating a presentation section adapted to present a three-dimensional image and located in front of the eyes of a viewer when worn on the head of the viewer; and
an imaging element provided in the enclosure and adapted to turn light external to the enclosure into an image, in which
the imaging element images light that is vertically downward relative to the enclosure and forward in the direction of line of sight of the viewer when the enclosure is worn on the head of the viewer.
(Feature 1-2)
The head mounted display of feature 1-1, in which
of the sides making up the enclosure, at least part of the bottom side located vertically downward relative to the enclosure when the enclosure is worn on the head of the viewer has a sloped area that tilts vertically upward, and in which
the imaging element is provided on the sloped area.
(Feature 1-3)
The head mounted display of feature 1-1 or 1-2, in which the imaging element acquires light external to the enclosure via a fisheye lens and turns it into an image.
(Feature 1-4)
The head mounted display of any one of features 1-1 to 1-3, in which
the imaging element turns light in the invisible range into an image.
(Feature 1-5)
The head mounted display of feature 1-4, in which
the imaging element turns light emitted by a light-emitting element that moves along with the motion of the viewer's hand into an image, the head mounted display further including:
a hand tracking block adapted to track the change in position of the light-emitting element by analyzing the image captured by the imaging element.
(Feature 1-6)
The head mounted display of feature 1-5, in which the light-emitting element that moves along with the motion of the viewer's hand is attached to a grip section gripped by the viewer.
(Feature 1-7)
The head mounted display of feature 1-5 or feature 1-6, in which
the hand tracking block includes:
a bright spot detection unit adapted to detect a bright spot of light in the image captured by the imaging element;
a vector acquisition unit adapted to acquire a vector having, as an end point, the bright spot detected by the bright spot detection unit, and, as a start point, the center of the image captured by the imaging element;
a pitch acquisition unit adapted to acquire, as a pitch of the light-emitting element relative to the imaging element, the length of the vector acquired by the vector acquisition unit; and
a yaw acquisition unit adapted to acquire, as a yaw of the light-emitting element relative to the imaging element, the declination of the vector acquired by the vector acquisition unit.
(Feature 1-8)
The head mounted display of any one of features 1-1 to 1-3, in which
the imaging element generates a visible light image by turning light in the visible range into an image, the head mounted display further including:
an image combining section adapted to combine the visible light image and a virtual image to be presented by the presentation section.
(Feature 1-9)
The head mounted display of feature 1-8 further including:
a gesture recognition unit adapted to recognize a gesture of the viewer captured by the imaging element.
(Feature 1-10)
A motion detector including:
an image acquisition section adapted to acquire an image captured by an imaging element attached to the head of a user by imaging infrared light radiated by a light-emitting element that moves along with the motion of the user's hand;
a bright spot detection unit adapted to detect a bright spot of infrared light in the image captured by the imaging element;
a vector acquisition unit adapted to acquire a vector having, as an end point, the bright spot detected by the bright spot detection unit, and, as a start point, the center of the image captured by the imaging element;
a pitch acquisition unit adapted to acquire, as a pitch of the light-emitting element relative to the imaging element, the length of the vector acquired by the vector acquisition unit; and
a yaw acquisition unit adapted to acquire, as a yaw of the light-emitting element relative to the imaging element, the declination of the vector acquired by the vector acquisition unit.
(Feature 1-11)
A motion detection method causing a processor to perform:
acquiring an image captured by an imaging element attached to the head of a user by imaging infrared light radiated by a light-emitting element that moves along with the motion of the user's hand;
detecting a bright spot of infrared light in the acquired image;

acquiring a vector having, as an end point, the detected bright spot, and, as a start point, the center of the image captured by the imaging element;

acquiring the length of the acquired vector; and acquiring the declination of the acquired vector.

(Feature 1-12)

A program causing a computer to implement the functions of:

acquiring an image captured by an imaging element attached to the head of a user by imaging infrared light radiated by a light-emitting element that moves along with the motion of the user's hand;

detecting a bright spot of infrared light in the acquired image;

acquiring a vector having, as an end point, the detected bright spot, and, as a start point, the center of the image captured by the imaging element;

acquiring the length of the acquired vector; and acquiring the declination of the acquired vector.

(Feature 1-13)

An image presentation system including:

a head mounted display; and a light-emitting element attached to a grip section gripped by a viewer and adapted to radiate infrared light, in which the head mounted display includes:

an enclosure accommodating a presentation section adapted to present a three-dimensional image and located in front of the eyes of the viewer when worn on the head of the viewer;

an imaging element provided in the enclosure and adapted to image infrared light radiated by the light-emitting element that moves along with the motion of the grip section; and a motion tracking section adapted to track the change in relative position of the light-emitting element with respect to the imaging element by analyzing the infrared light image captured by the imaging element.

(Feature 2-1)

A head mounted display including:

an enclosure accommodating a presentation section adapted to present a three-dimensional image and located in front of the eyes of a viewer when worn on the head of the viewer;

an enclosure light-emitting element adapted to radiate light vertically downward relative to the enclosure when the enclosure is worn on the head of the viewer;

an image acquisition section adapted to acquire an image of light of the enclosure light-emitting element which is captured by a torso imaging element attached to the torso of the viewer to image light radiated by the enclosure light-emitting element; and a head tracking block adapted to track the relative motion of the enclosure light-emitting element with respect to the torso imaging element by analyzing the light image acquired by the image acquisition section.

(Feature 2-2)

The head mounted display of feature 2-1 further including:

an enclosure imaging section provided in the enclosure and adapted to image light radiated by a light-emitting element that moves along with the motion of the viewer's hand, in which the enclosure light-emitting element is located more forward in the direction of line of sight of the viewer and more vertically upward than the enclosure imaging section when the enclosure is worn on the head of the viewer, and in which the enclosure allows shielding between the enclosure imaging section and enclosure light-emitting element.

(Feature 2-3)

The head mounted display of feature 2-1 or 2-2, in which the head tracking block detects the yaw of the enclosure light-emitting element with respect to the torso imaging element.

(Feature 2-4)

The head mounted display of any one of features 2-1 to 2-3, in which the head tracking block further includes:

an area definition portion adapted to define, in the image captured by the torso imaging element, a presence area of the enclosure light-emitting element determined as an area where the enclosure light-emitting element is present; and a bright spot analysis portion adapted to detect the motion of the enclosure light-emitting element by analyzing the motion of the bright spot in the presence area of the enclosure light-emitting element defined by the area definition portion.

(Feature 2-5)

The head mounted display of feature 2-4, in which the bright spot analysis portion includes:

a locus detection unit adapted to detect the locus of the bright spot of light in the image captured by the torso imaging element;

a fitting unit adapted to acquire the arc that fits the locus detected by the locus detection unit;

a vector acquisition unit adapted to acquire a radius vector having, as a start point, the center of the circle including the arc acquired by the fitting unit, and, as an end point, the bright spot in the image; and a yaw acquisition unit adapted to acquire the declination of the radius vector acquired by the vector acquisition unit.

(Feature 2-6)

The head mounted display of feature 2-5, in which the bright spot analysis portion further includes:

a bright spot selection unit adapted to identify, in the presence of a plurality of bright spots in the area defined by the area definition portion, the bright spot derived from the enclosure light-emitting element based on at least either the difference in size or brightness of the bright spots in the image.

(Feature 2-7)

The head mounted display of feature 2-6, in which the bright spot selection unit compares the plurality of bright spots in the image in terms of size and selects the smallest one.

(Feature 2-8)

The head mounted display of feature 2-6, in which light radiated by the enclosure light-emitting element differs in wavelength from that radiated by the light-emitting element that moves along with the motion of the viewer's hand, in which the torso imaging element images light passing through an optical filter having a higher transmittance of light radiated by the enclosure light-emitting element than that radiated by the light-emitting element that moves along with the motion of the viewer's hand, and in which the bright spot selection unit compares the plurality of bright spots in the image in terms of brightness and selects the one with the highest brightness.

(Feature 2-9)

The head mounted display of any one of features 2-4 to 2-8, in which the area definition portion defines, as a presence area of the enclosure light-emitting element, a sector-shaped area centered at the center of the circle including the arc acquired by the fitting unit.

(Feature 2-10)

The head mounted display of feature 2-2 further including:

a hand tracking block adapted to track the relative motion of the light-emitting element that moves along with the motion of the viewer's hand with respect to the enclosure imaging section by analyzing the image captured by the enclosure imaging section.

(Feature 2-11)

The head mounted display of any one of features 2-1 to 2-10, in which the torso imaging element has an element support section attachable to the torso of the viewer, and in which the element support section includes an adjustment section adapted to adjust the tilt of the torso imaging element.

(Feature 2-12)

The head mounted display of any one of features 2-1 to 2-11, in which the enclosure light-emitting element radiates light in the invisible range.

(Feature 2-13)

A motion detection method for an image presentation system, the image presentation system including:

a head mounted display;

a torso imaging element capable of communicating with the head mounted display and attached to the torso of a viewer; and a light-emitting element that moves along with the motion of the viewer's hand, in which a processor of the head mounted display performs:

turning light radiated by the light-emitting element that moves along with the motion of the viewer's hand into an image;

detecting the relative motion of the light-emitting element with respect to the head mounted display by analyzing the image of light radiated by the light-emitting element;

radiating light vertically downward relative to the head mounted display when the head mounted display is worn on the head of the viewer;

acquiring an image captured by the torso imaging element by imaging light radiated vertically downward; and detecting the relative motion of the head mounted display with respect to the torso imaging element by analyzing the acquired image captured by the torso imaging element.

(Feature 2-14)

A program for causing a computer of an image presentation system to implement a motion detection function, the image presentation system including:

a head mounted display;

a torso imaging element capable of communicating with the head mounted display and attached to the torso of a viewer; and a light-emitting element that moves along with the motion of the viewer's hand, the motion detection function including the functions of:

radiating light vertically downward relative to the head mounted display when the head mounted display is worn on the head of the viewer;

turning light radiated by the light-emitting element that moves along with the motion of the viewer's hand into an image;

detecting the relative motion of the light-emitting element with respect to the head mounted display by analyzing the image of light radiated by the light-emitting element;

acquiring an image captured by the torso imaging element by imaging light radiated vertically downward; and detecting the relative motion of the head mounted display with respect to the torso imaging element by analyzing the acquired image captured by the torso imaging element.

(Feature 3-1)

An image presentation system including:

a head mounted display;

a first imaging element capable of communicating with the head mounted display; and a first light-emitting element that moves along with the motion of the user's hand, in which the head mounted display includes:

an enclosure accommodating a presentation section adapted to present a three-dimensional image and located in front of the eyes of the user when worn on the head of the user;

a second light-emitting element provided in the enclosure and adapted to radiate light vertically downward relative to the enclosure when the enclosure is worn on the head of the user; and a second imaging element provided in the enclosure and adapted to image light radiated by the first light-emitting element, and in which the first imaging element is attached to the torso of the user and images light radiated by the second light-emitting element.

(Feature 3-2)

A motion detection method for an image presentation system, the image presentation system including:

a head mounted display;

a first imaging element capable of communicating with the head mounted display; and a first light-emitting element that moves along with the motion of the user's hand, in which a processor of the head mounted display performs:

radiating light vertically downward relative to the head mounted display when the head mounted display is worn on the head of the viewer;

turning light radiated by the first light-emitting element into an image;

detecting the relative motion of the first light-emitting element with respect to the head mounted display by analyzing the image of light radiated by the first light-emitting element;

acquiring an image captured by the first imaging element attached to the torso of the user by imaging light radiated vertically downward; and detecting the relative motion of the head mounted display with respect to the first imaging element by analyzing the acquired image captured by the first imaging element.

(Feature 3-3)

A head mounted display including:

an enclosure accommodating a presentation section adapted to present a three-dimensional image and located in front of the eyes of the user when worn on the head of the user;

an imaging element provided in the enclosure and adapted to image light radiated by a first light-emitting element that moves along with the motion of the user's hand;

a second light-emitting element provided in the enclosure and adapted to radiate light vertically downward relative to the enclosure when the enclosure is worn on the head of the user; and an image acquisition section adapted to acquire an image of light radiated by the second light-emitting element captured by an imaging element attached to the torso of the user. (Feature 3-4)

A motion detector including:

an image acquisition section adapted to acquire an image captured by detecting, with an imaging element attached to the torso of the user, light radiated by a light-emitting element that moves along with the motion of the user's head;

a locus detection unit adapted to detect the locus of a bright spot of light in the image acquired by the image acquisition section;

a fitting unit adapted to acquire the arc that fits the locus detected by the locus detection unit;

a vector acquisition unit adapted to acquire a radius vector having, as a start point, the center of the circle including the arc acquired by the fitting unit, and, as an end point, the bright spot in the image; and a yaw acquisition unit adapted to acquire the declination of the radius vector acquired by the vector acquisition unit as a yaw of the light-emitting element with respect to the imaging element.

The present technology contains subject matter related to that disclosed in Japanese Priority Patent Application JP 2012-244142 filed in the Japan Patent Office on Nov. 6, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A head mounted display comprising:
    an enclosure accommodating a presentation section adapted to present a three-dimensional image and located in front of eyes of a viewer when worn on a head of the viewer;
    a torso fastened imaging device configured for electronic communication with said presentation section, wherein the torso fastened imaging device images a subject including light radiated by a light emitting element of the enclosure;
    an imaging element provided in the enclosure and adapted to turn light external to the enclosure into an image, wherein the light is in at least one of an invisible range and a visible range and is emitted by a light-emitting element attached to a grip section gripped by the viewer and that moves along with a motion of the viewer's hand, and the imaging element images the light that is vertically downward relative to the enclosure and forward in a direction of a line of sight of the viewer when the enclosure is worn on the head of the viewer; and
    a hand tracking block adapted to track a change in position of the light-emitting element by analyzing the image captured by the imaging element.

2. The head mounted display of claim 1, wherein
    among sides making up the enclosure, at least part of a bottom side located vertically downward relative to the enclosure when the enclosure is worn on the head of the viewer has a sloped area that tilts vertically upward, and
    the imaging element is provided on the sloped area.

3. The head mounted display of claim 1, wherein the imaging element acquires the light external to the enclosure via a fisheye lens and turns the light into an image.

4. The head mounted display of claim 1, wherein the hand tracking block comprises:
    a bright spot detection unit adapted to detect a bright spot of the light in the image captured by the imaging element;
    a vector acquisition unit adapted to acquire a vector having, as an end point, the bright spot detected by the bright spot detection unit, and, as a start point, a center of the image captured by the imaging element;
    a pitch acquisition unit adapted to acquire, as a pitch of the light-emitting element relative to the imaging element, a length of the vector acquired by the vector acquisition unit; and
    a yaw acquisition unit adapted to acquire, as a yaw of the light-emitting element relative to the imaging element, a declination of the vector acquired by the vector acquisition unit.

5. The head mounted display of claim 1, wherein
    the imaging element generates the image by turning the light that is in the visible range into the image, the head mounted display further comprising:
    an image combining section adapted to combine the visible light image and a virtual image to be presented by the presentation section.

6. The head mounted display of claim 5 further comprising: a gesture recognition unit adapted to recognize a gesture of the viewer captured by the imaging element.

7. A motion detector comprising:
    an image acquisition section adapted to acquire an image, captured by an imaging element of an enclosure attached to the head of a viewer by imaging infrared light radiated by a light-emitting element attached to a grip section gripped by the viewer and that moves along with the motion of the user's hand, wherein the imaging element images the light that is vertically downward and forward in a direction of a line of sight of the viewer;
    a hand tracking block adapted to track a change in position of the light-emitting element by analyzing the image captured by the imaging element;
    a torso fastened imaging device configured for electronic communication with said image acquisition section, wherein the torso fastened imaging device images a subject including light radiated by a light emitting element of the enclosure;
    a bright spot detection unit adapted to detect a bright spot of the infrared light in the image captured by the imaging element;
    a vector acquisition unit adapted to acquire a vector having, as an end point, the bright spot detected by the bright spot detection unit, and, as a start point, a center of the image captured by the imaging element;
    a pitch acquisition unit adapted to acquire, as a pitch of the light-emitting element relative to the imaging element, a length of the vector acquired by the vector acquisition unit; and
    a yaw acquisition unit adapted to acquire, as a yaw of the light-emitting element relative to the imaging element, a declination of the vector acquired by the vector acquisition unit.

8. A motion detection method causing a processor to:
    acquire an image captured by an imaging element attached to the head of a user by imaging infrared light radiated by a light-emitting element that moves along with the motion of the user's hand;
    acquire an image, captured by an imaging element of an enclosure attached to the head of a user, by imaging infrared light radiated by a light-emitting element attached to a grip section gripped by the viewer and that moves along with motion of the user's hand, wherein the imaging element images the light that is vertically downward and forward in a direction of a line of sight of the user;

tracking a change in position of the light-emitting element by analyzing the image captured by the imaging element;

imaging a subject including light radiated by a light emitting element of the enclosure via a torso fastened imaging device;

detect a bright spot of infrared light in the acquired image;

acquire a vector having, as an end point, the detected bright spot, and, as a start point, a center of the image captured by the imaging element;

acquire a length of the acquired vector; and acquire a declination of the acquired vector.

9. A non-transitory, computer readable recording medium containing a computer program, which when executed by a processor, causes the processor to perform the functions of:

acquiring an image captured by an imaging element of an enclosure attached to the head of a viewer, by imaging infrared light radiated by a light-emitting element attached to a grip section gripped by the viewer and that that moves along with the motion of the viewer's hand, wherein the imaging element image the light that is vertically downward and forward in a direction of a line of sight of the viewer;

tracking a change in position of the light-emitting element by analyzing the image captured by the imaging element;

imaging a subject including light radiated by a light emitting element of the enclosure via a torso fastened imaging device;

detecting a bright spot of infrared light in the acquired image;

acquiring a vector having, as an end point, the detected bright spot, and, as a start point, a center of the image captured by the imaging element;

acquiring a length of the acquired vector; and acquiring a declination of the acquired vector.

10. An image presentation system comprising:

a head mounted display;

a torso fastened imaging device configured for electronic communication with a presentation section, wherein the torso fastened imaging device images a subject including light radiated by a light emitting element of an enclosure of the head mounted display; and a light-emitting element attached to a grip section gripped by a viewer and adapted to radiate infrared light and that move along with a motion of viewer's hand, the head mounted display includes:

the enclosure accommodating said presentation section adapted to present a three-dimensional image and located in front of eyes of the viewer when worn on a head of the viewer;

an imaging element provided in the enclosure and adapted to image the infrared light radiated by the light-emitting element that moves along with the motion of the grip section, wherein the imaging element images the light that is vertically downward relative to the enclosure and forward in a direction of a line of sight of the viewer when the enclosure is worn on the head of the viewer; and a motion tracking section adapted to track the change in relative position of the light-emitting element with respect to the imaging element by analyzing the infrared light image captured by the imaging element.

* * * * *